(12) United States Patent  
Teichert

(10) Patent No.: US 10,260,483 B2  
(45) Date of Patent: Apr. 16, 2019

(54) FIXATION DEVICE FOR SERVICING WIND TURBINE COMPONENTS

(71) Applicant: PP Energy ApS, Nordborg (DK)

(72) Inventor: Paul Teichert, Sydals (DK)

(73) Assignee: PP Energy ApS, Nordborg (DK)

( * ) Notice: Subject to any disclaimer, the term of this patent is extended or adjusted under 35 U.S.C. 154(b) by 337 days.

(21) Appl. No.: 15/102,317

(22) PCT Filed: Dec. 10, 2014

(86) PCT No.: PCT/DK2014/050423  
§ 371 (c)(1),  
(2) Date: Jun. 7, 2016

(87) PCT Pub. No.: WO2015/086030  
PCT Pub. Date: Jun. 18, 2015

(65) Prior Publication Data  
US 2016/0369767 A1 Dec. 22, 2016

(30) Foreign Application Priority Data

Dec. 10, 2013 (DK) .................................. 2013 70756

(51) Int. Cl.  
*F03D 7/02* (2006.01)  
*F03D 80/50* (2016.01)  
*F03D 80/80* (2016.01)

(52) U.S. Cl.  
CPC ........... *F03D 80/50* (2016.05); *F03D 7/0264* (2013.01); *F03D 80/88* (2016.05);  
(Continued)

(58) Field of Classification Search  
CPC .......... F03D 13/00; F03D 13/10; F03D 13/25; F03D 80/58; F03D 80/55; F05B 2230/61  
See application file for complete search history.

(56) References Cited

U.S. PATENT DOCUMENTS

2007/0200103 A1* 8/2007 Viladomiu i Guarro ..................  
                                            B66C 23/207  
                                            254/334  
2010/0135797 A1* 6/2010 Nies ........................ F03D 80/50  
                                              416/9

(Continued)

FOREIGN PATENT DOCUMENTS

CA          2732577 A1 * 8/2011 ........... B66C 23/207  
CN          1764782 A     4/2006  
(Continued)

OTHER PUBLICATIONS

International Search Report for PCT Serial No. PCT/DK2014/050423 dated Mar. 2, 2015.

*Primary Examiner* — Richard A Edgar  
(74) *Attorney, Agent, or Firm* — McCormick, Paulding & Huber LLP

(57) ABSTRACT

A fixation device for providing at least one fixation location at a wind turbine, the wind turbine including a wind turbine tower, a nacelle and a hub for a number of rotor blades. The fixation device includes at least one fixation arm configured for being arranged at the nacelle and/or the wind turbine tower, the at least one fixation arm being extendable. The at least one fixation arm in an inactive state, when arranged at the nacelle, is not extending essentially forward of the nacelle.

19 Claims, 35 Drawing Sheets

(52) U.S. Cl.
CPC ....... *F05B 2230/61* (2013.01); *F05B 2230/80* (2013.01); *F05B 2250/34* (2013.01); *Y02E 10/726* (2013.01); *Y02P 70/523* (2015.11)

(56) References Cited

U.S. PATENT DOCUMENTS

| | | | |
|---|---|---|---|
| 2012/0192400 A1* | 8/2012 | Malaschewski | E04G 3/30 29/428 |
| 2012/0228881 A1* | 9/2012 | Siegfriedsen | F03D 13/20 290/55 |

FOREIGN PATENT DOCUMENTS

| | | | |
|---|---|---|---|
| CN | 101548100 A | 9/2009 | |
| CN | 102032096 A | 4/2011 | |
| CN | 102639870 A | 8/2012 | |
| EP | 1 101 934 A2 | 5/2001 | |
| EP | 1583905 A2 | 10/2005 | |
| EP | 2358995 A2 | 8/2011 | |
| EP | 2 520 533 A1 | 11/2012 | |
| EP | 2538073 A2 | 12/2012 | |
| WO | 03/048569 A2 | 6/2003 | |
| WO | 2005/064152 A2 | 7/2005 | |
| WO | 2007/085265 A1 | 8/2007 | |
| WO | 2009/155917 A2 | 12/2009 | |
| WO | 2009/155918 A2 | 12/2009 | |
| WO | 2010/034288 A2 | 4/2010 | |
| WO | 2010/037392 A2 | 4/2010 | |
| WO | 2012/040534 A2 | 3/2012 | |

\* cited by examiner

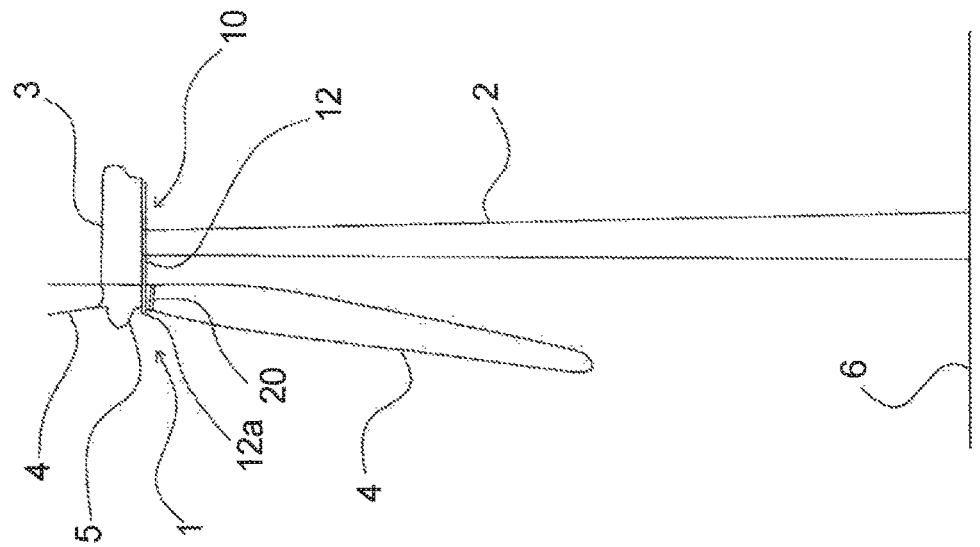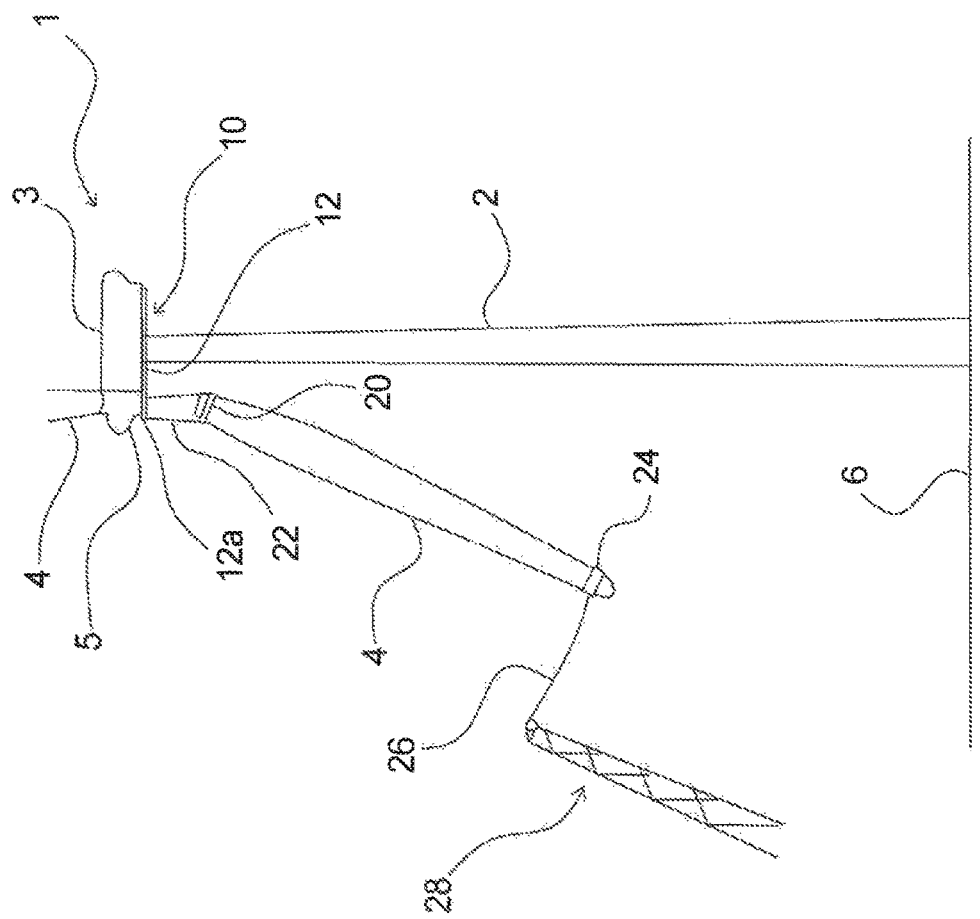

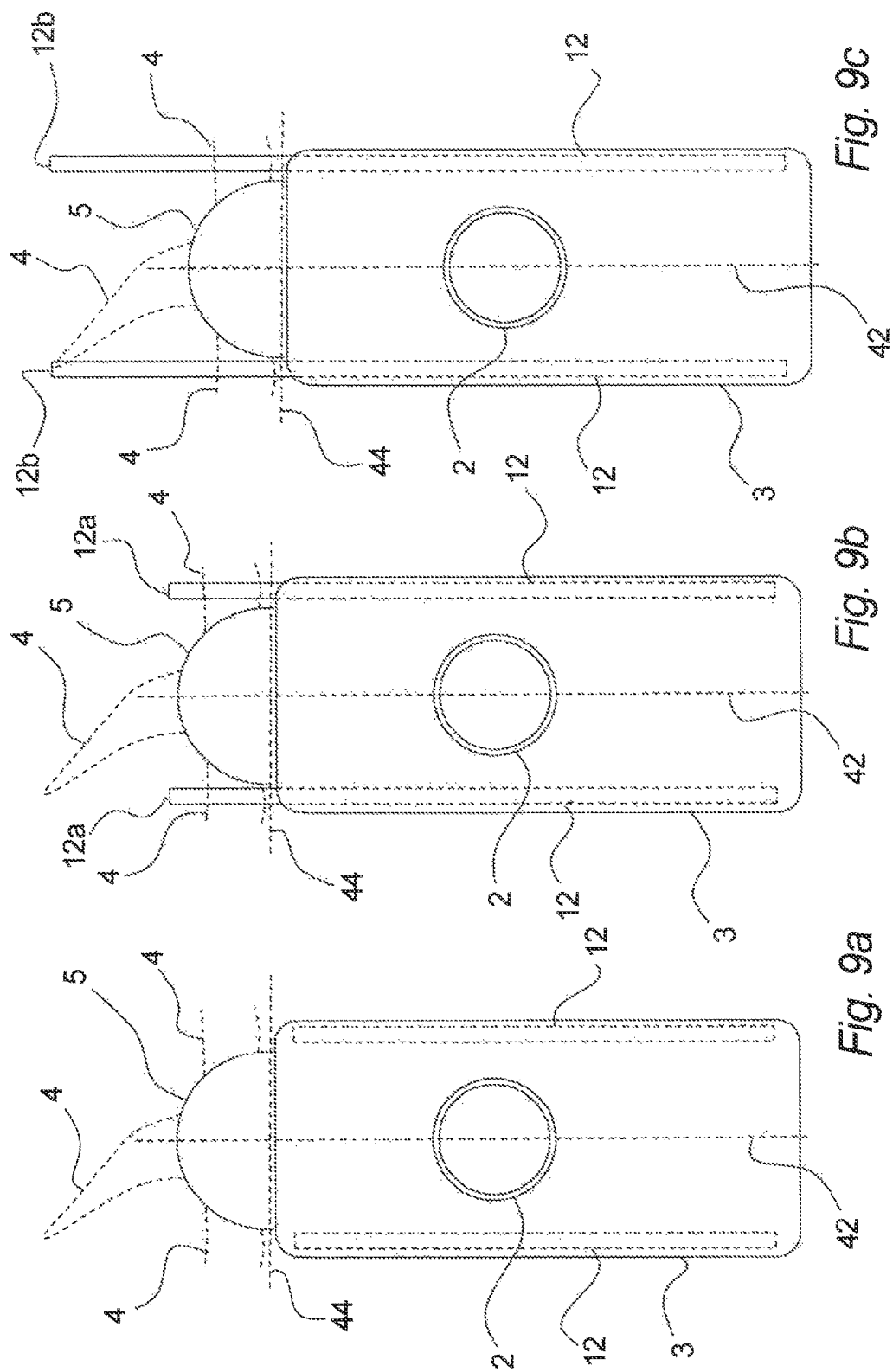

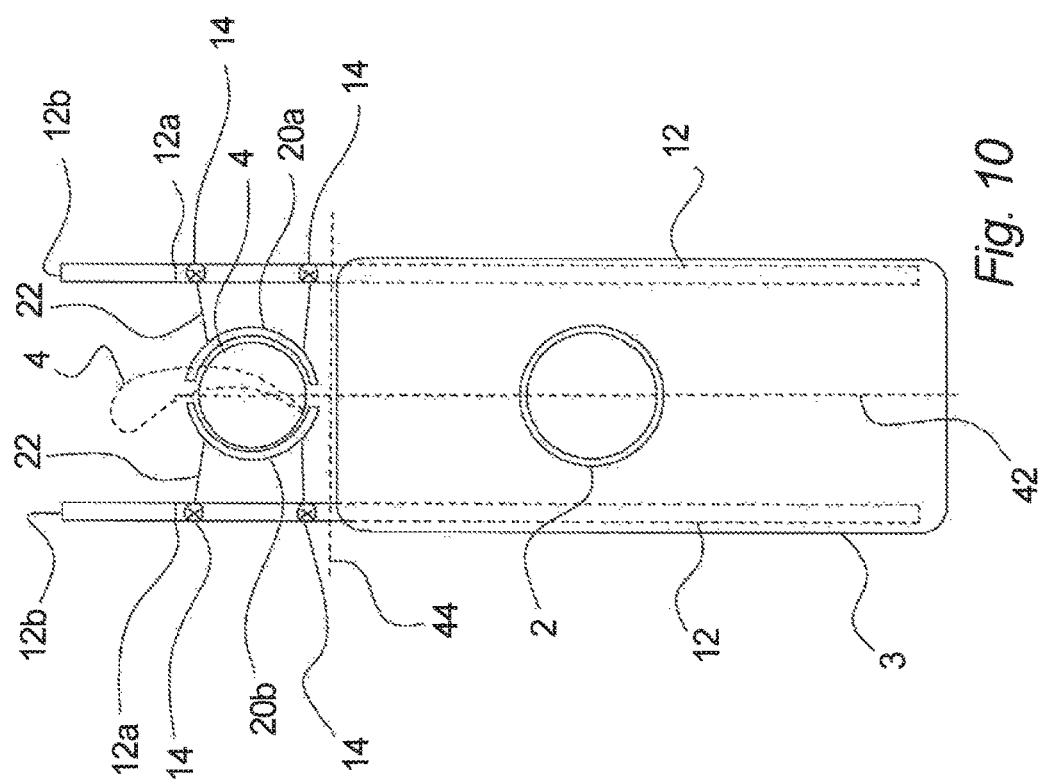

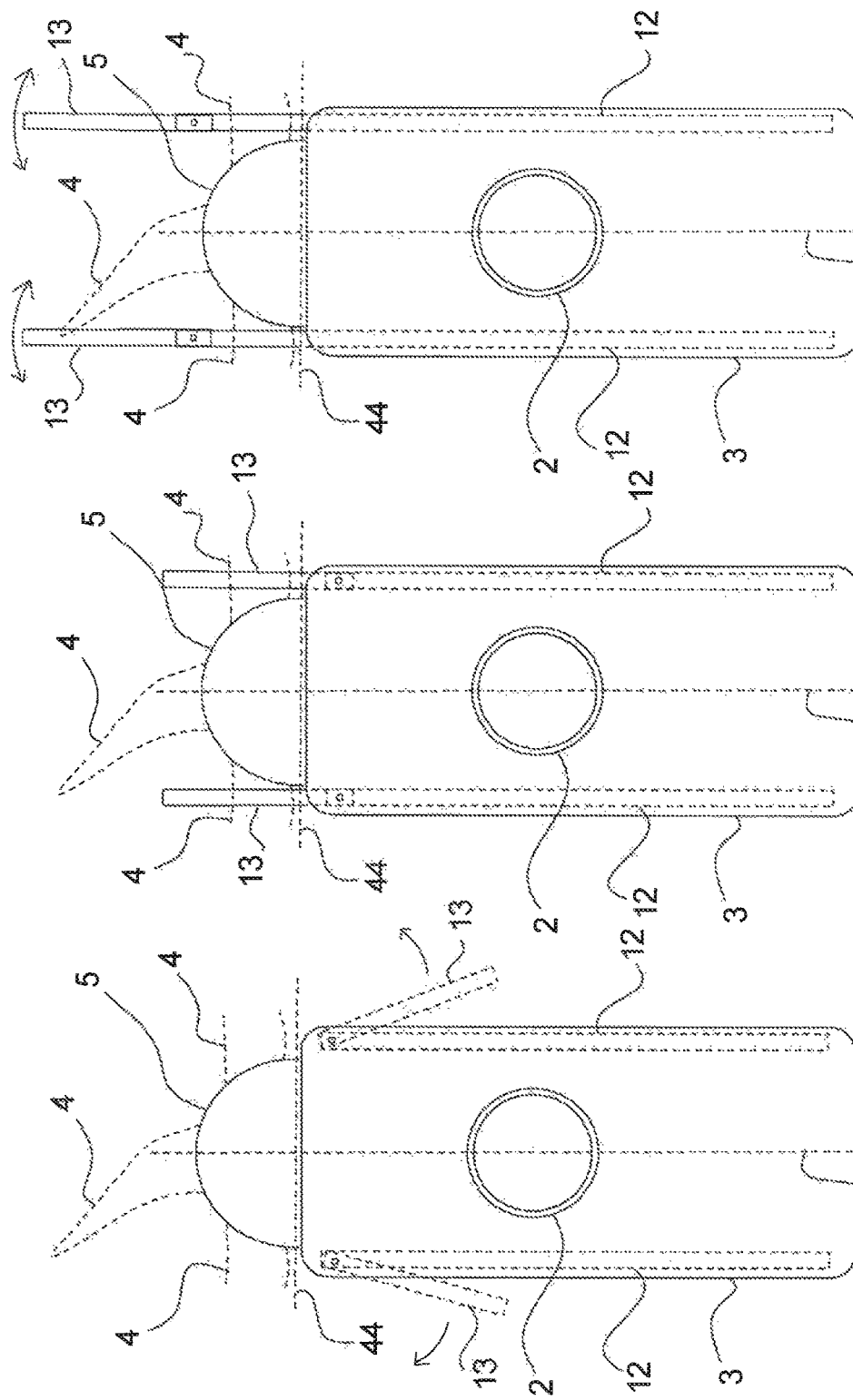

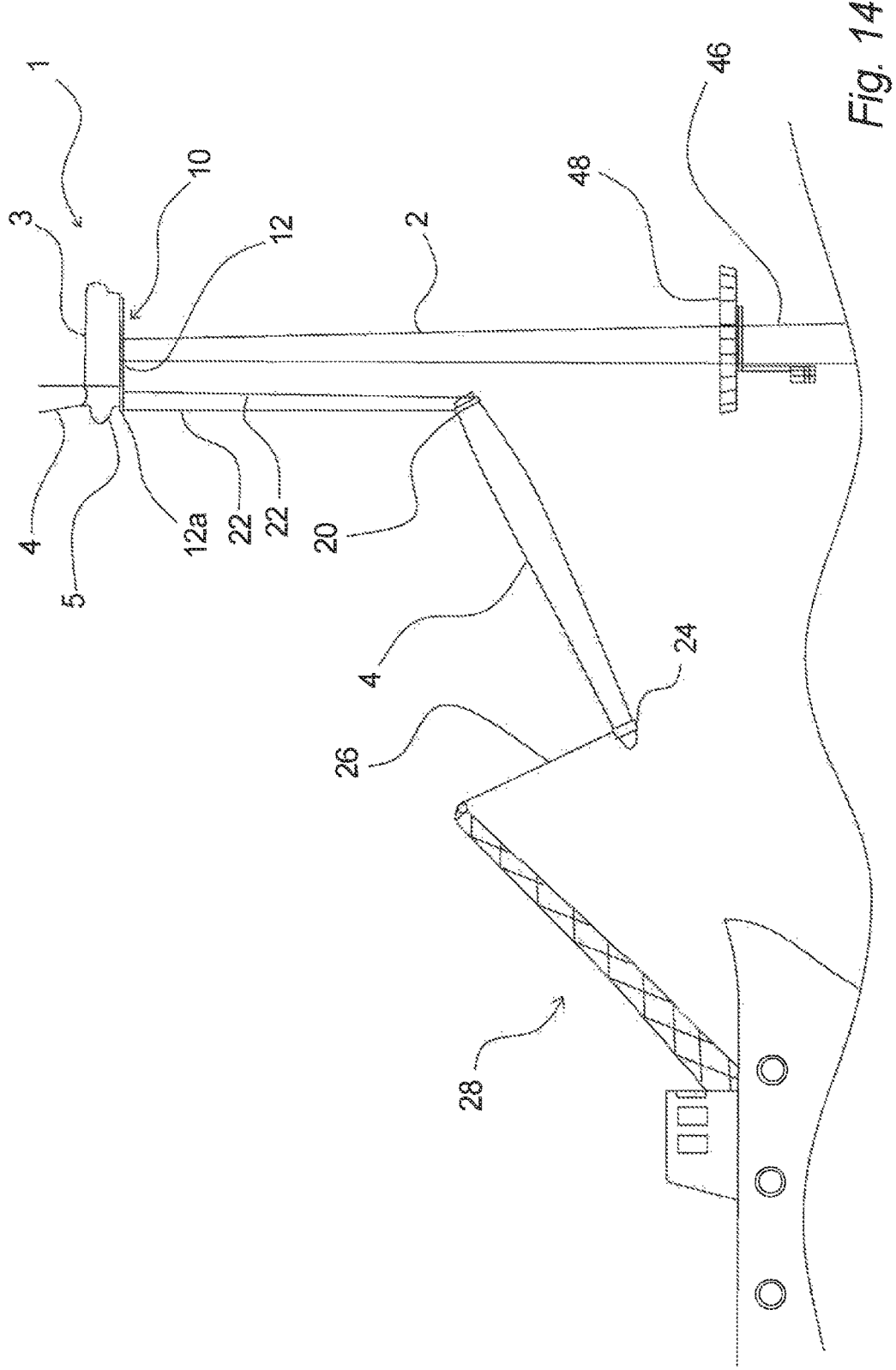

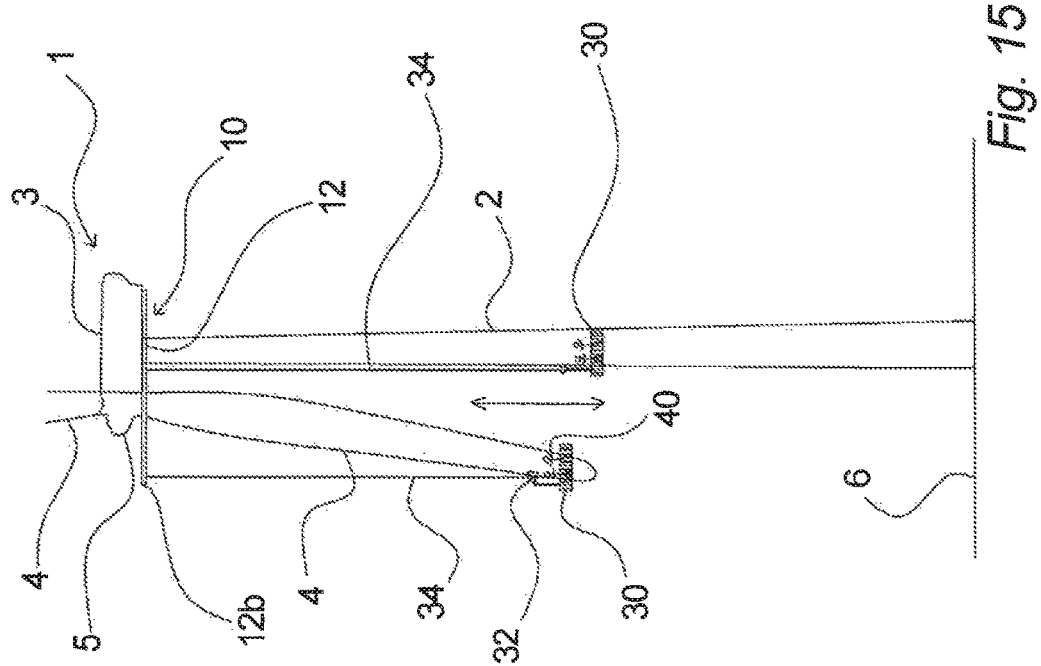

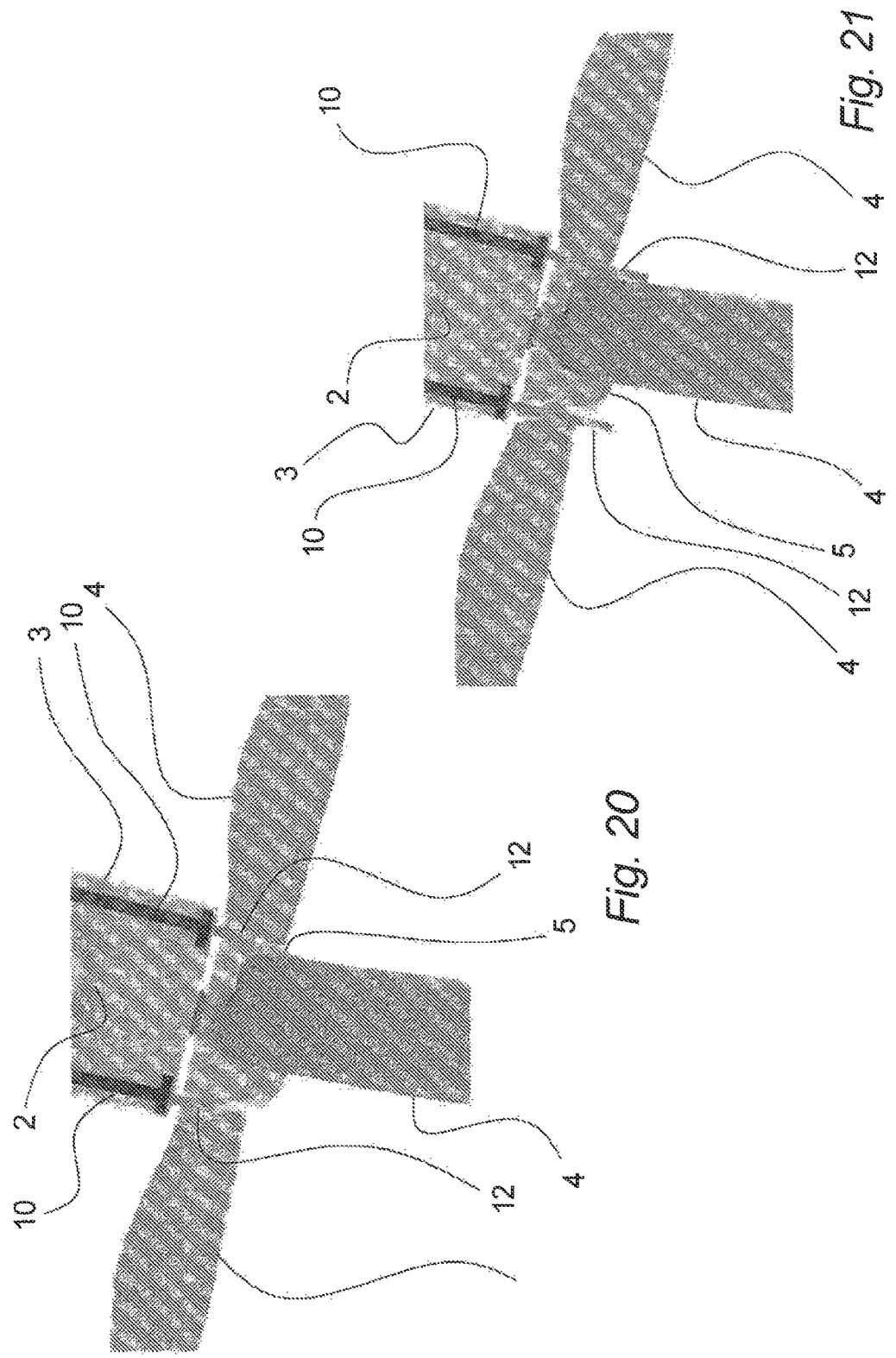

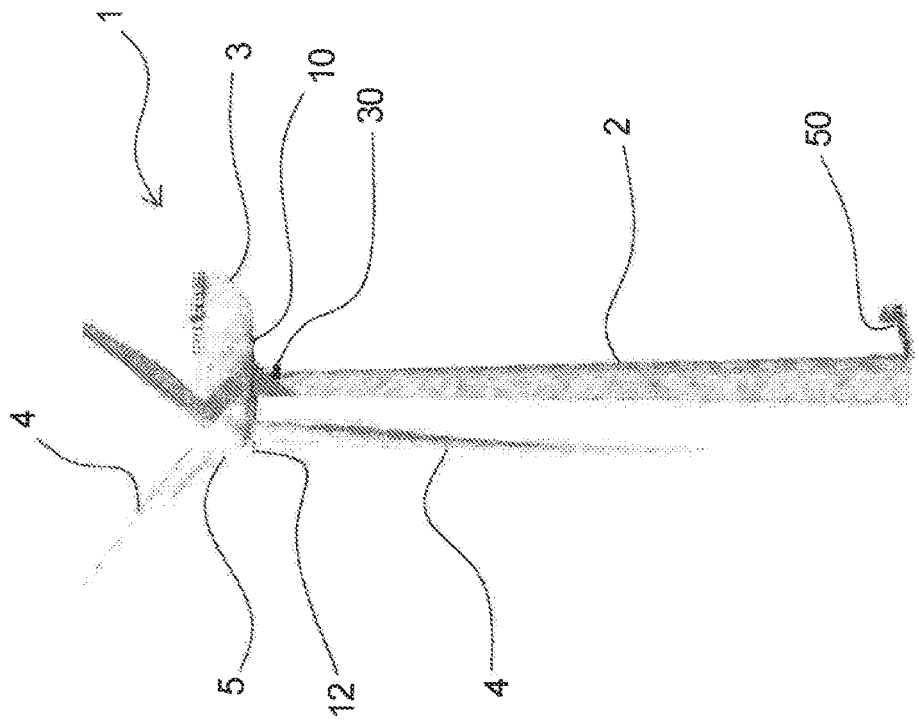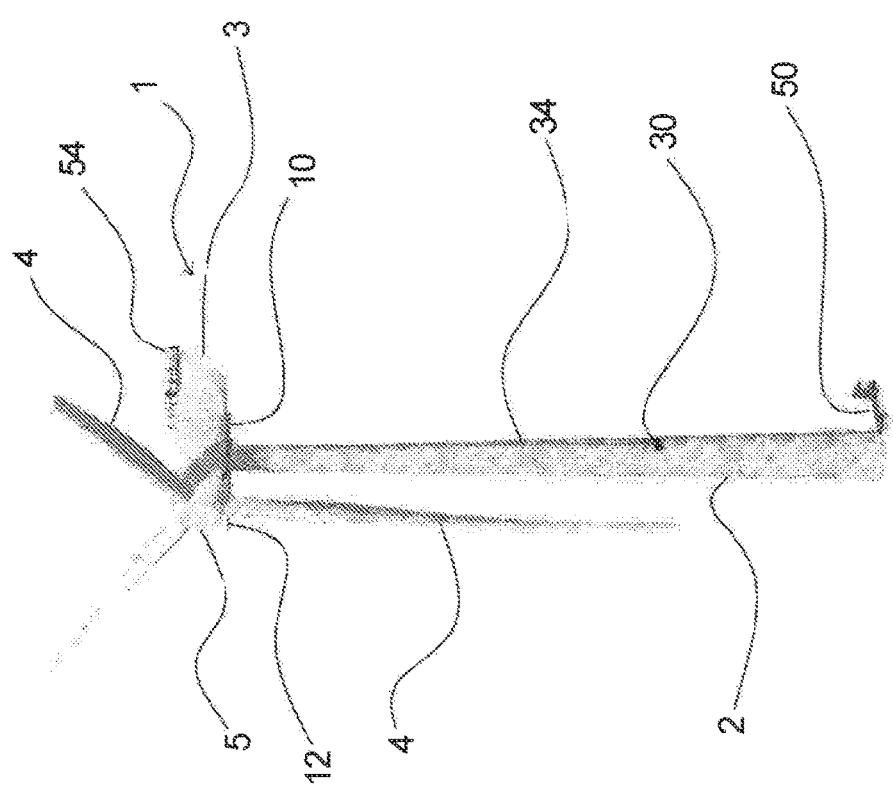

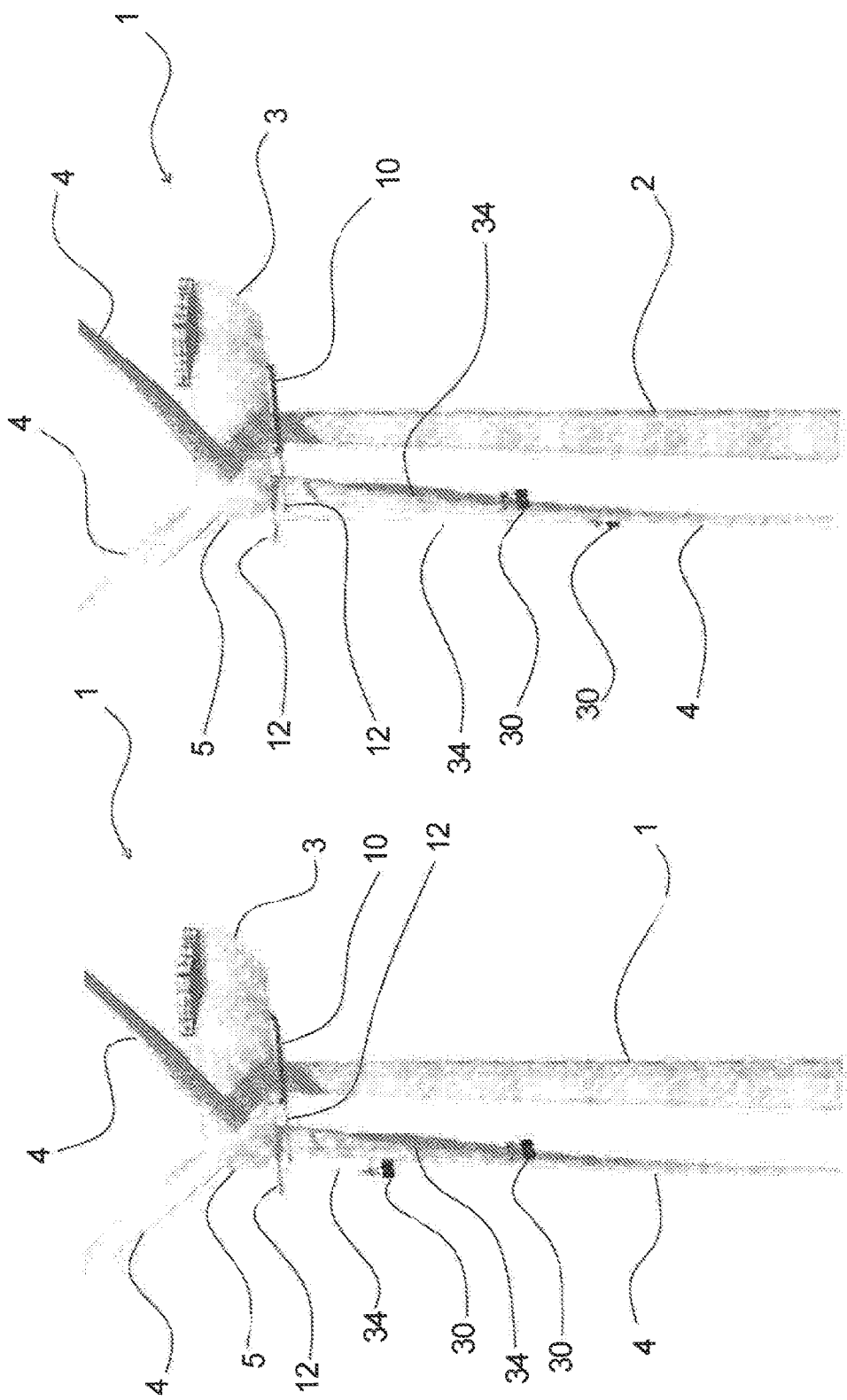

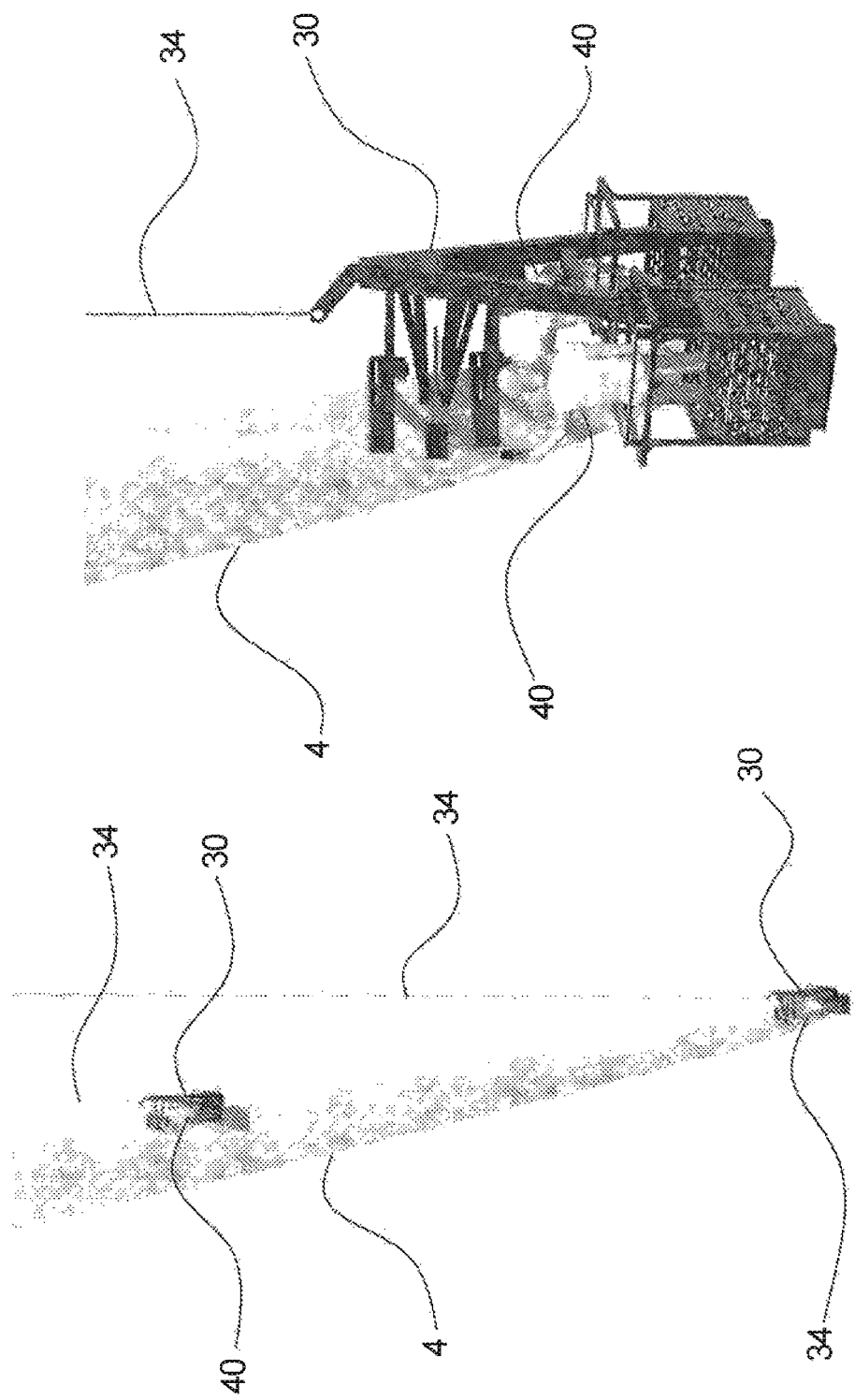

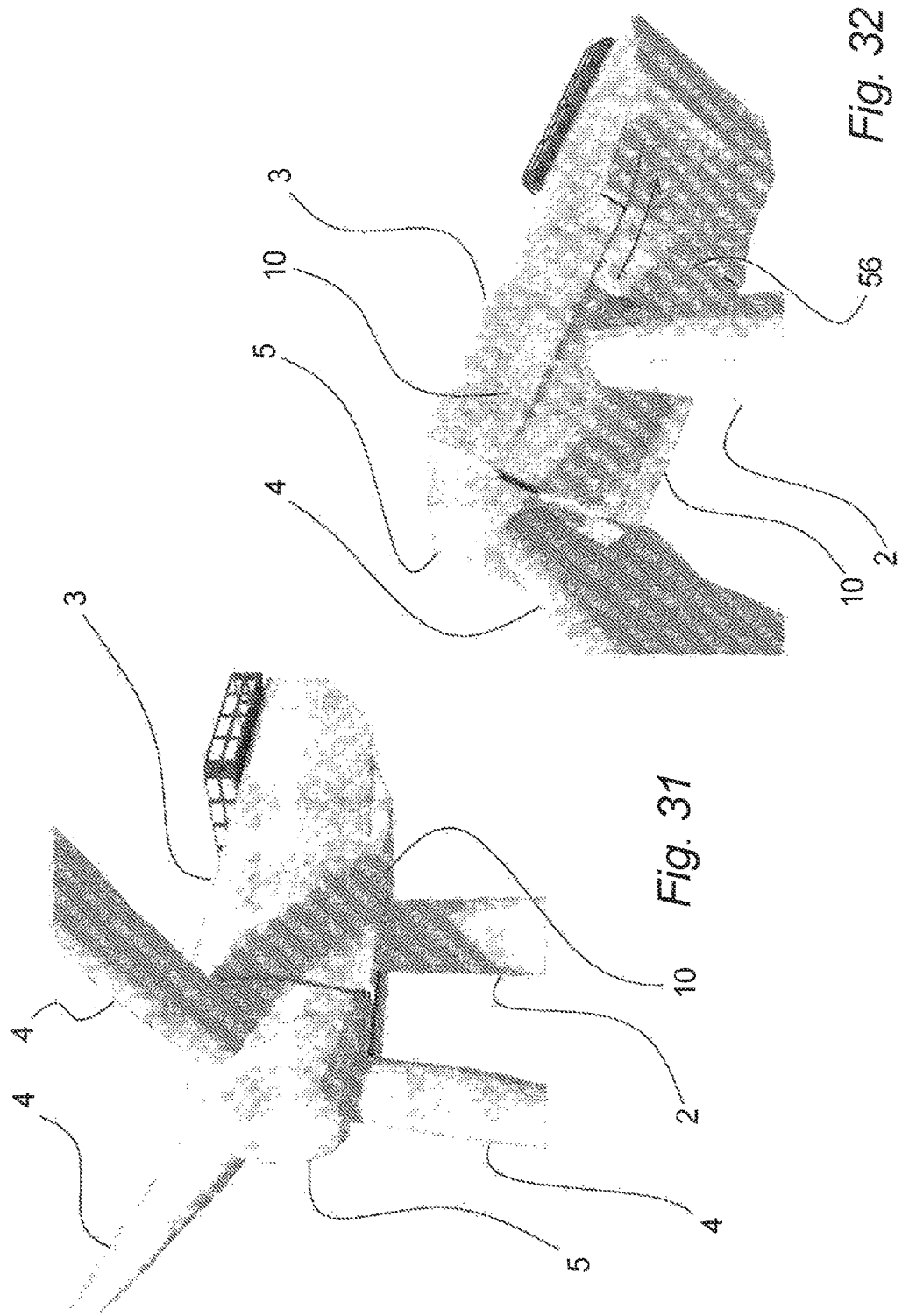

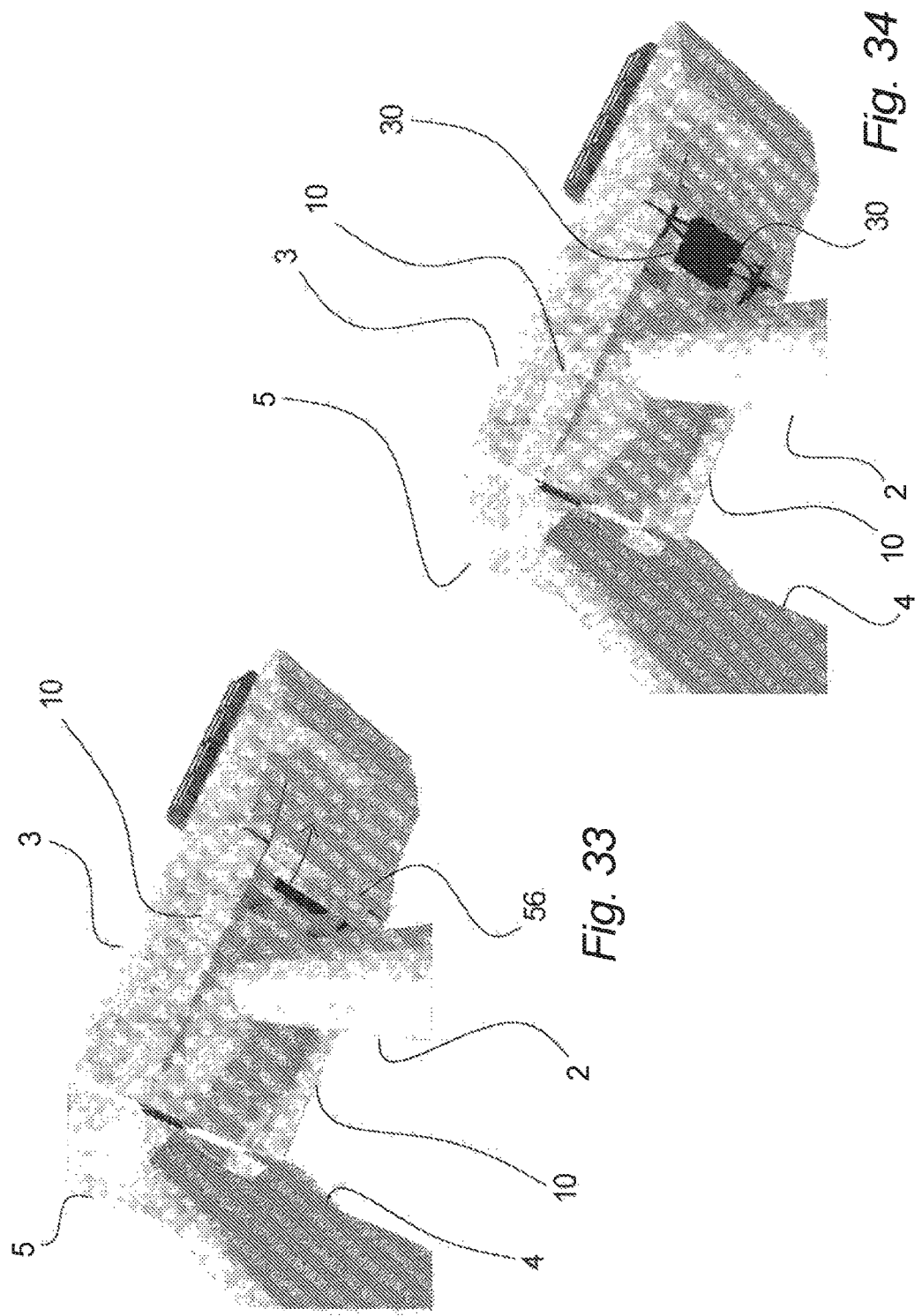

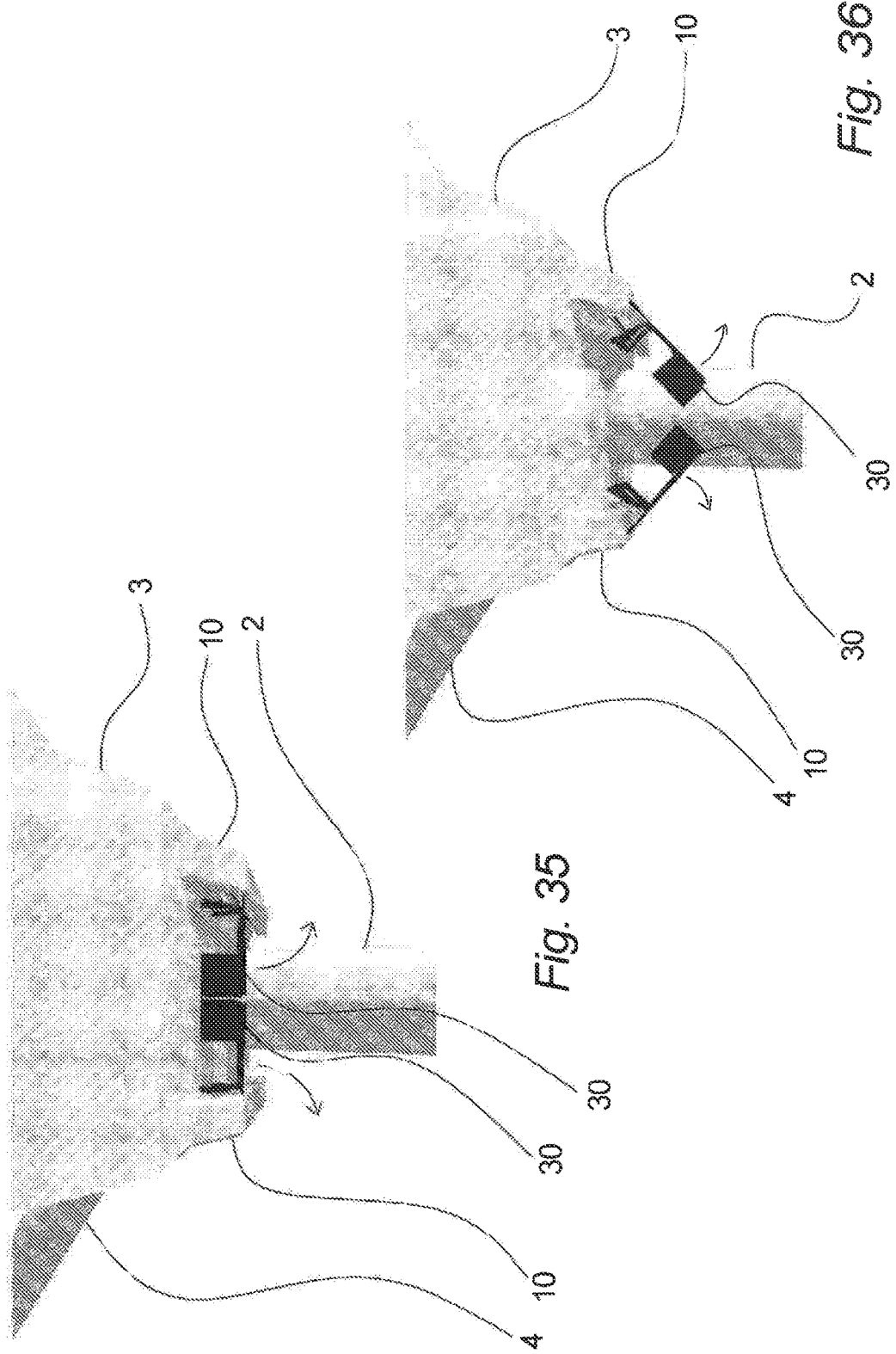

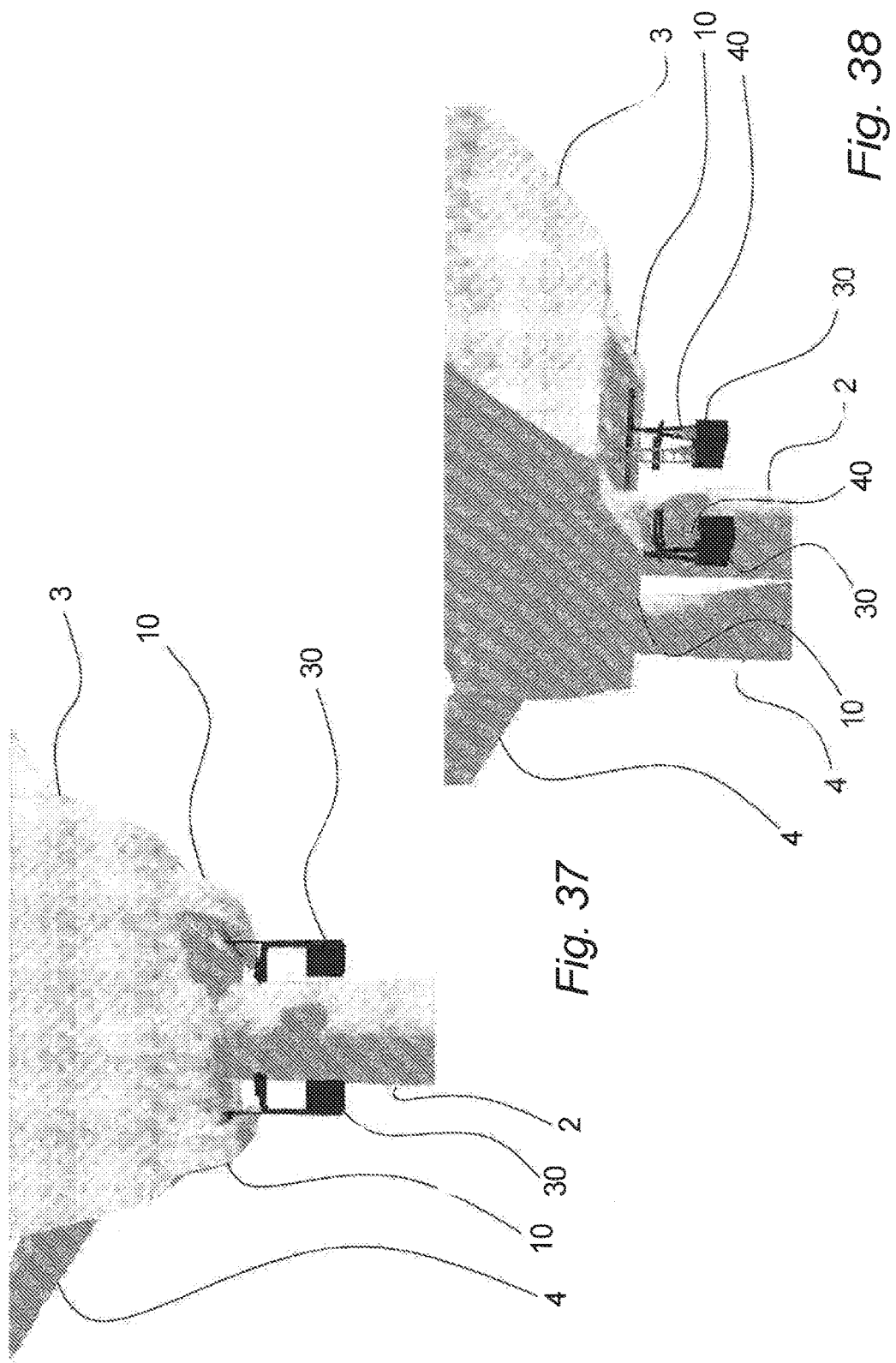

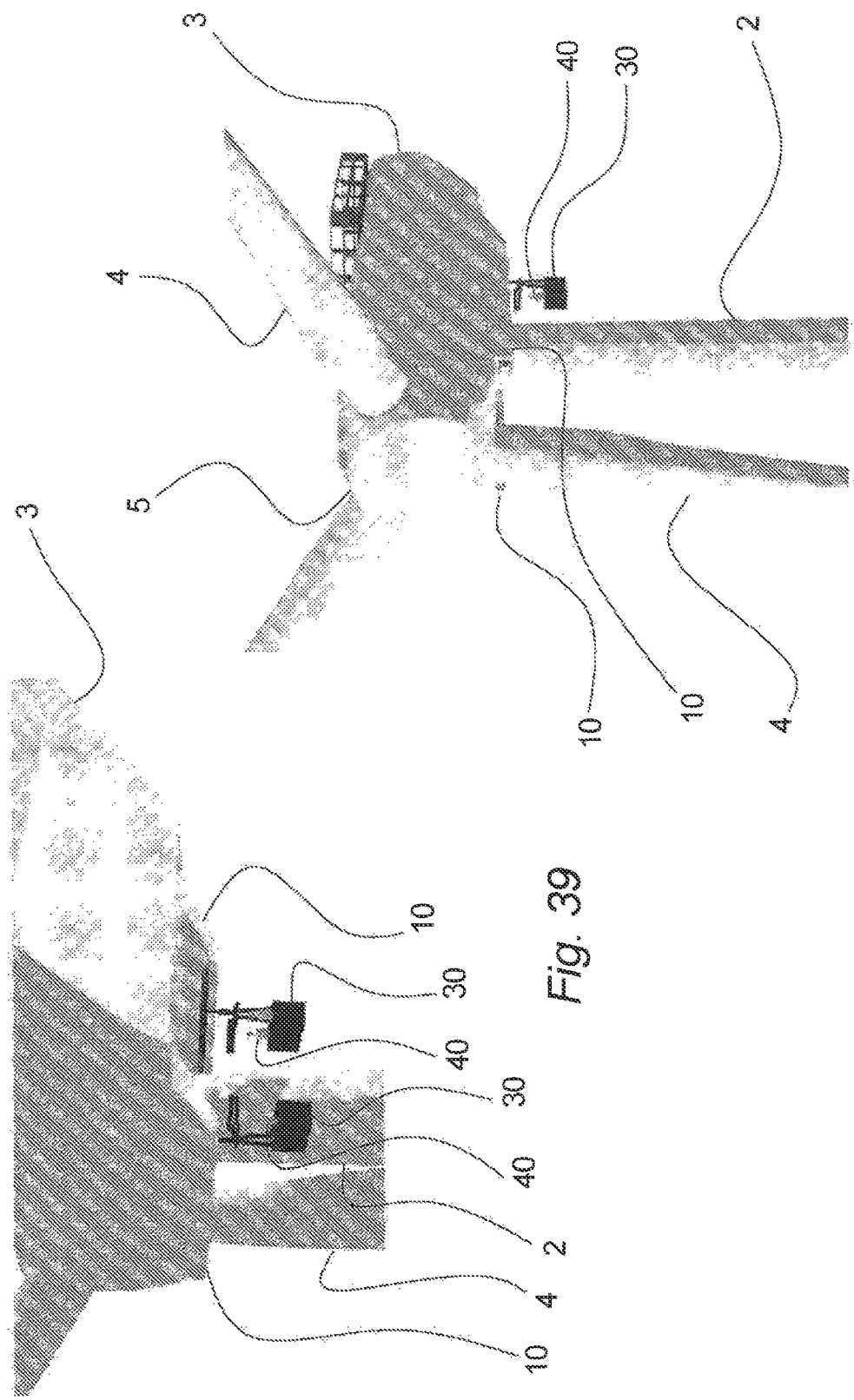

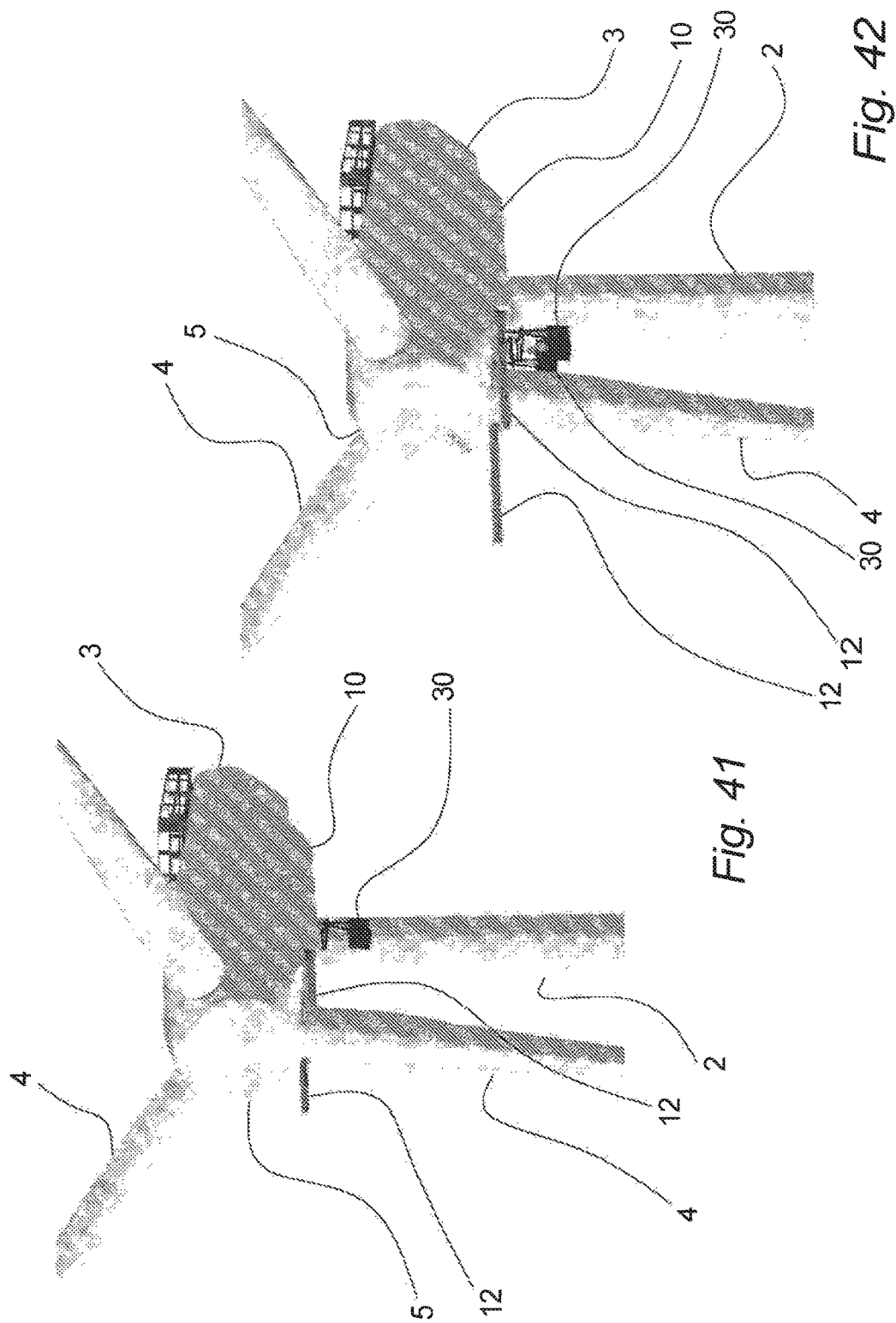

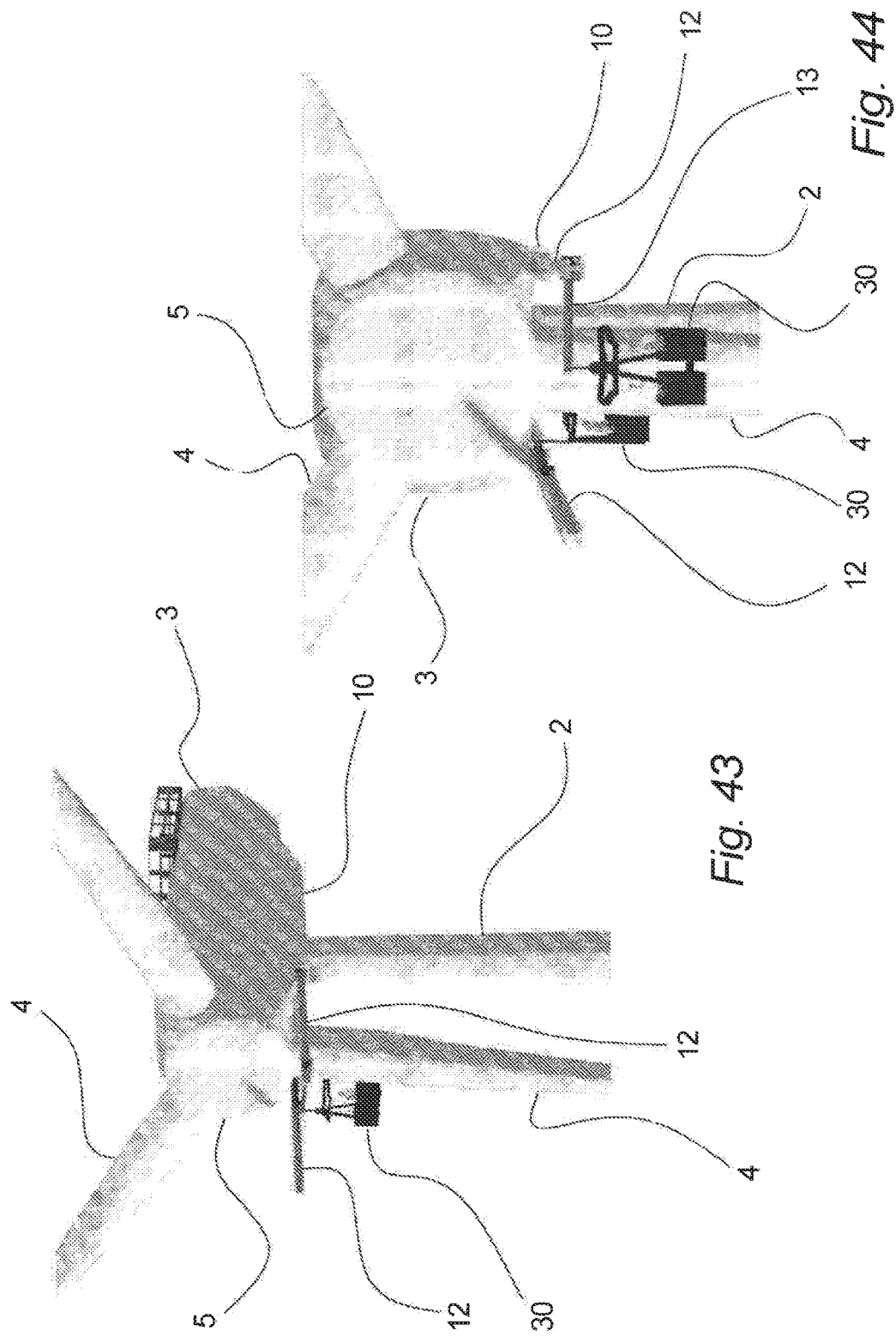

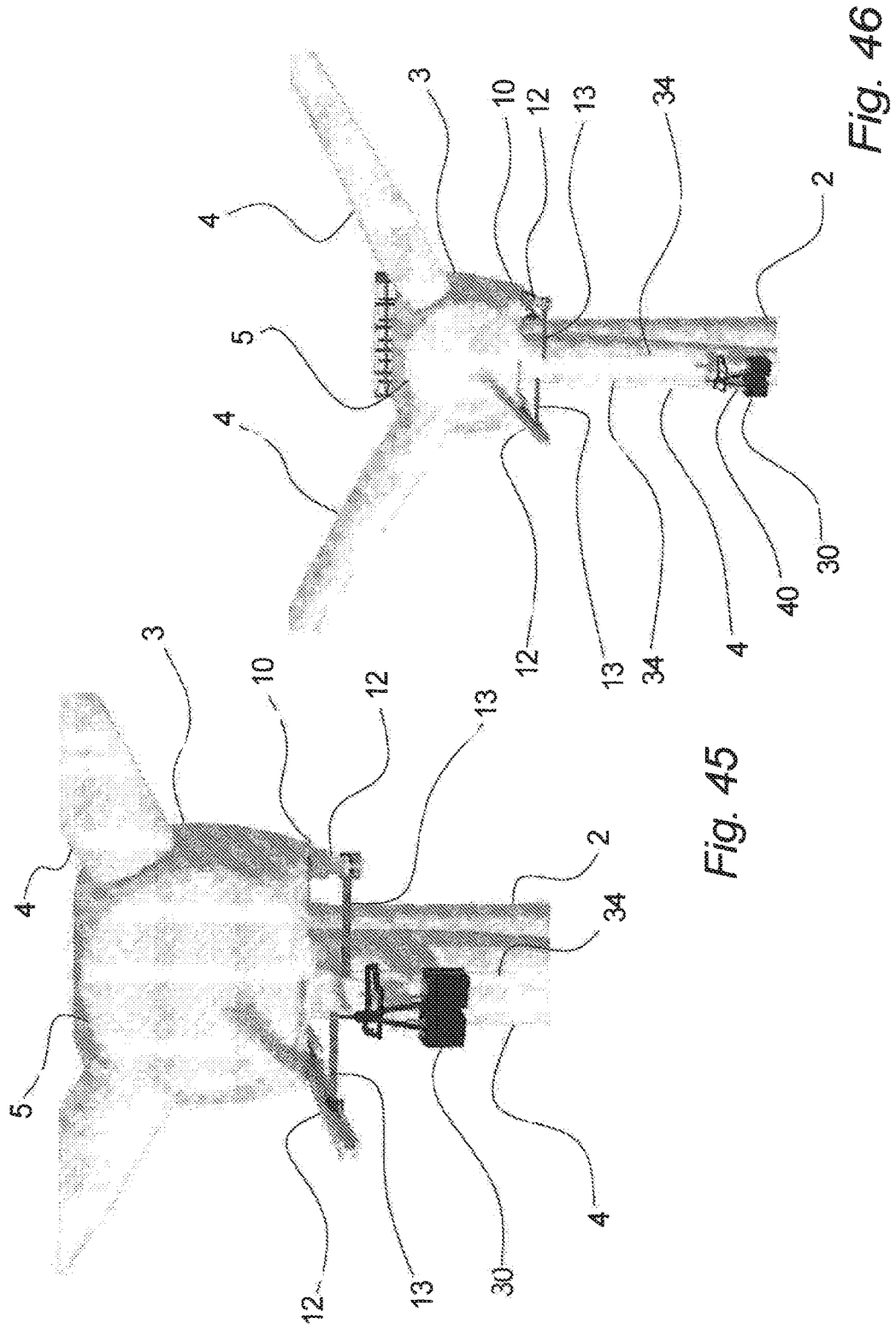

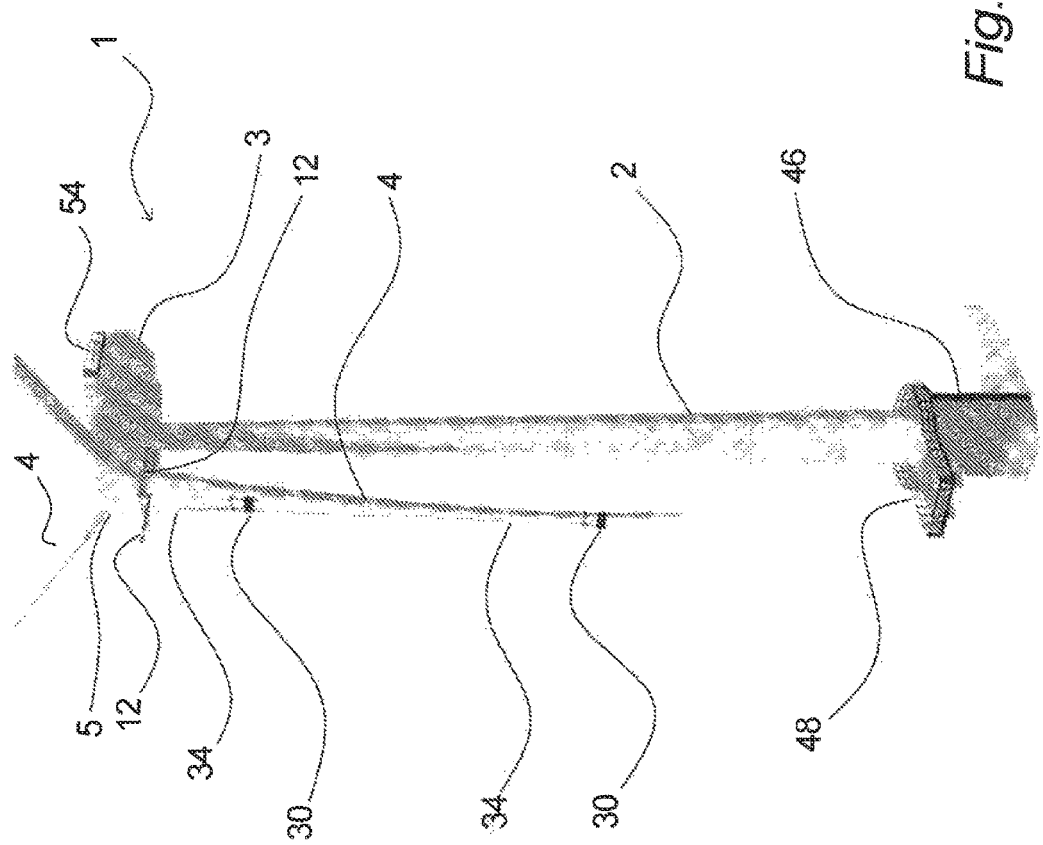

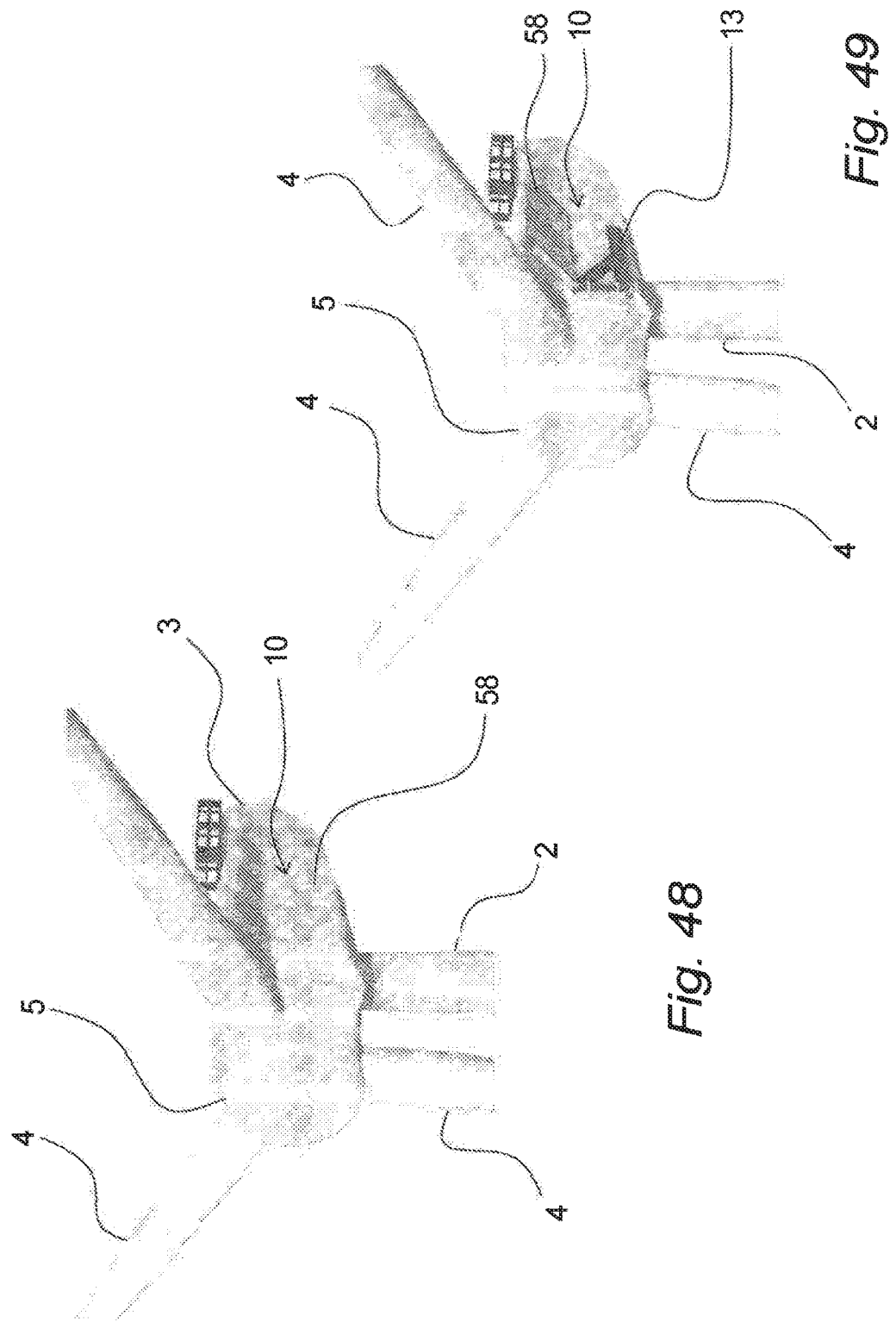

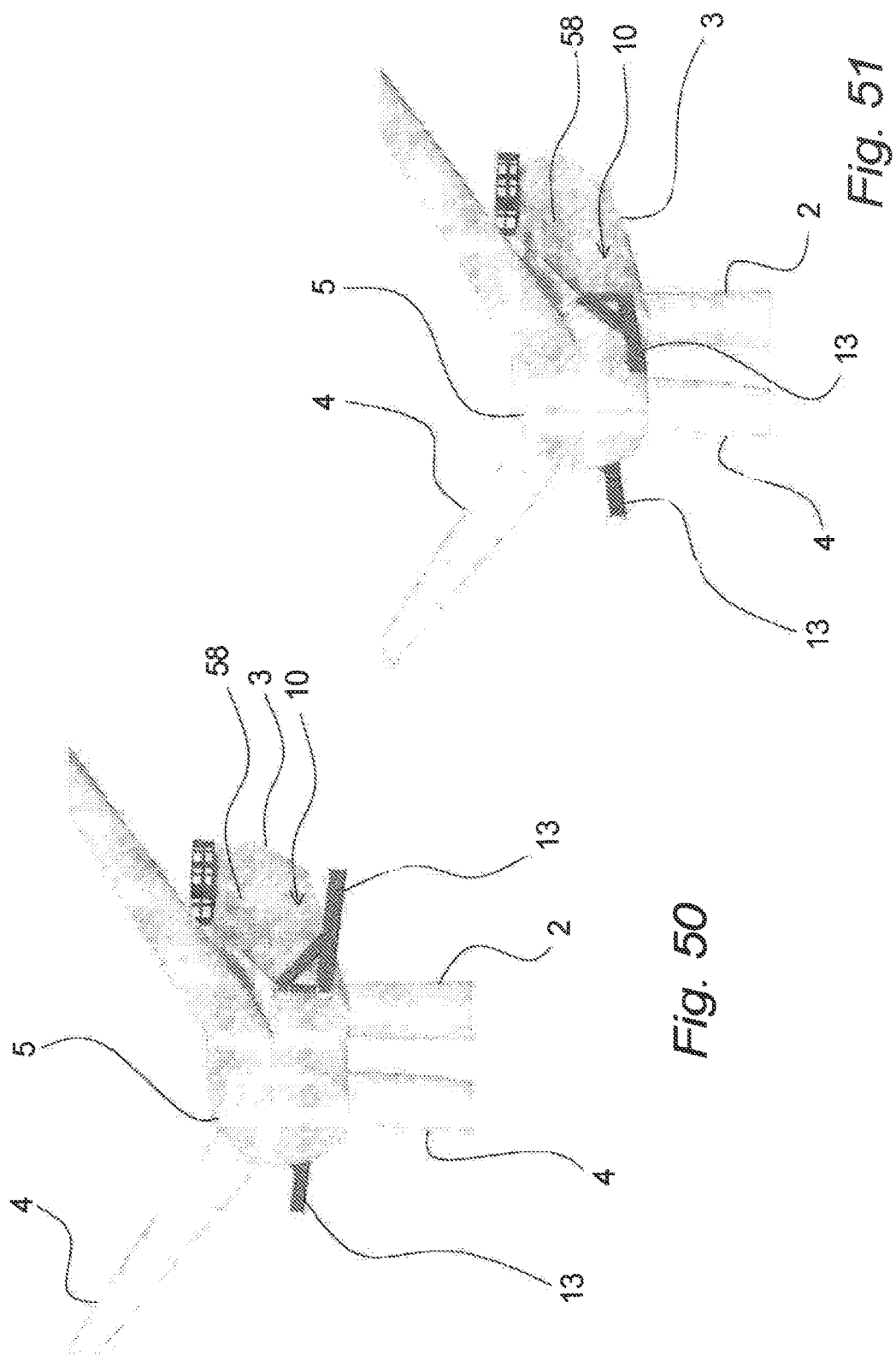

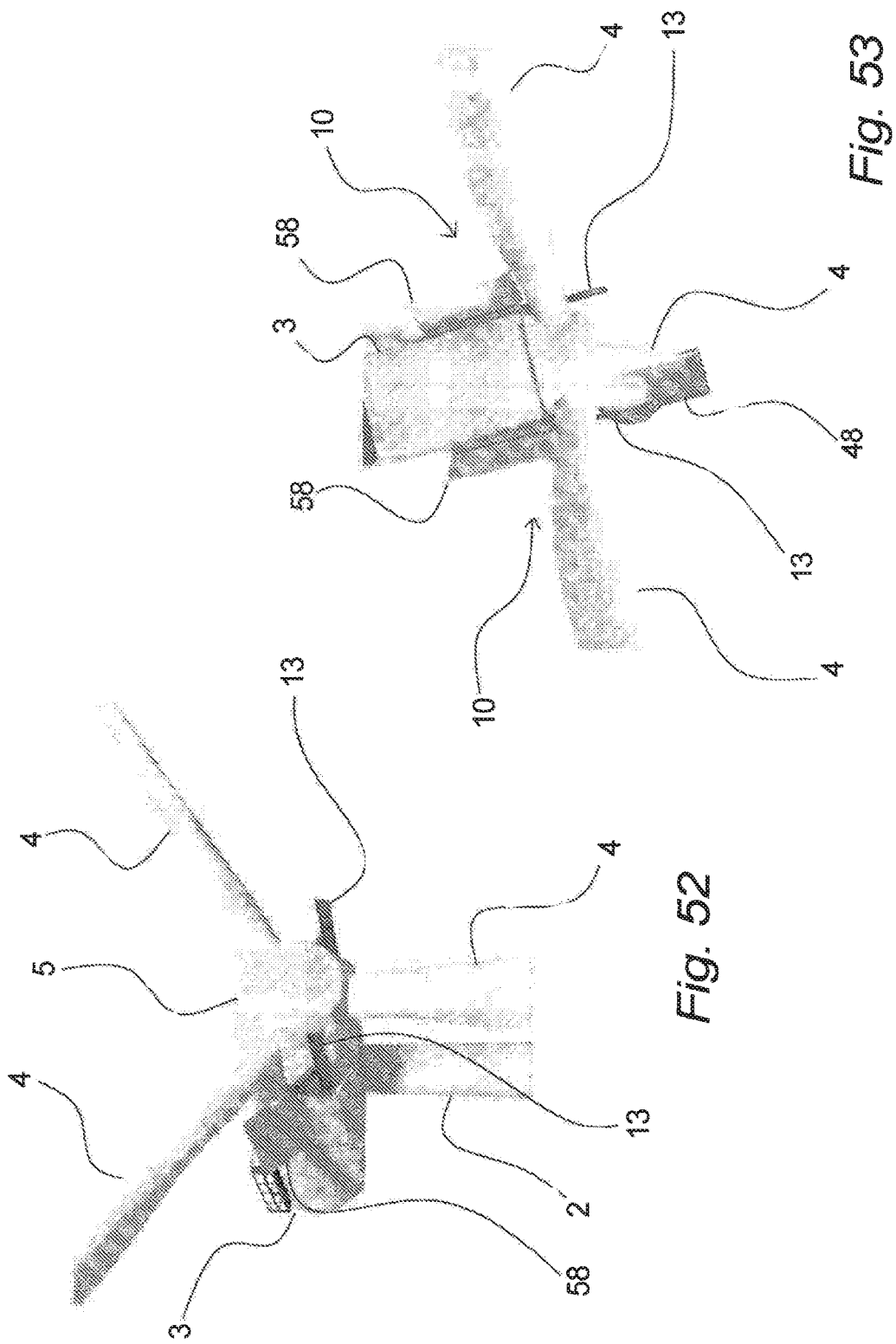

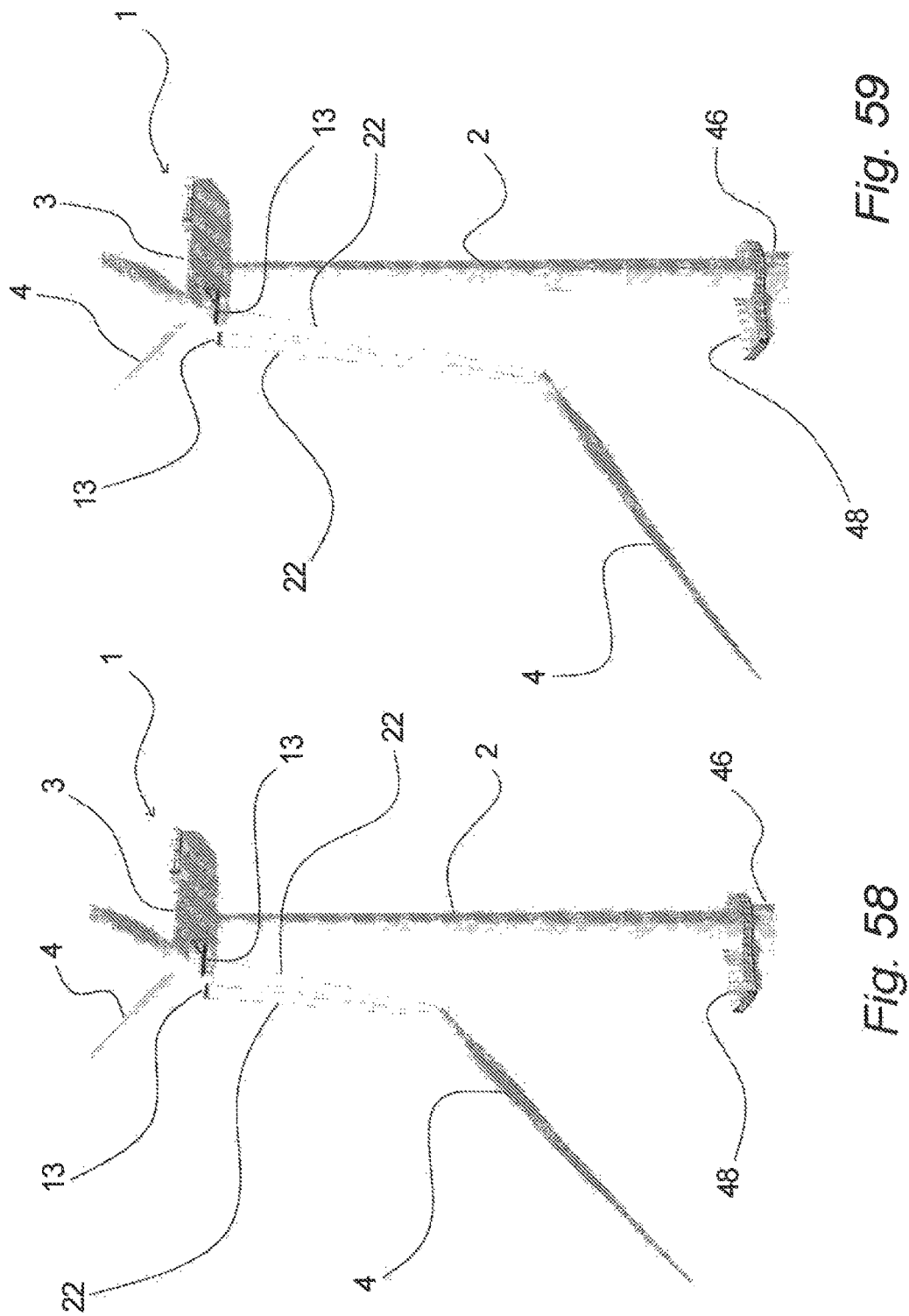

FIXATION DEVICE FOR SERVICING WIND TURBINE COMPONENTS

CROSS-REFERENCE TO RELATED APPLICATIONS

This application is entitled to the benefit of and incorporates by reference subject matter disclosed in the International Patent Application No. PCT/DK2014/050423 filed on Dec. 10, 2014 and Danish Patent Application No. PA 2013 70756 filed on Dec. 10, 2013.

TECHNICAL FIELD

The invention relates to a fixation device for providing at least one fixation location at a wind turbine, said wind turbine comprising at least a wind turbine tower, a nacelle and a hub for a number of rotor blades.

Further, the invention relates to a wind turbine comprising such a fixation device.

Furthermore, the invention relates to a method for providing a fixation location in connection with a wind turbine.

BACKGROUND

Wind turbines are continuously growing in size, which increases the challenges
- related to the construction of the wind turbines,
- related to the mounting demounting, replacement, etc. of elements such as e.g. rotor blades, tower and tower elements, and
- related to other activities for servicing the wind turbines, such as e.g. inspecting, repairing, cleaning, etc. the rotor blades.

When building wind turbines, cranes, e.g. mobile cranes, cranes on trucks, lorries in case of land based constructions and ships, jack-up rigs, barges, etc. in case of sea-based constructions have usually been used and due to the increasing size of the wind turbines, such crane equipment needs to increase correspondingly in size, which increases costs correspondingly.

In connection with replacement of elements such as e.g. rotor blades, cranes have also been used for land-based as well as sea-based wind turbines, and it will be understood that this will increase costs considerably for such jobs, both because of the great size of the crane equipment and because the circumstances need to be suitable, when using such equipment, e.g. the weather condition in general and the wind condition in particular, especially when sea-based wind turbines are considered.

It has also been suggested to mount a service crane on a wind turbine, e.g. as disclosed in WO 2010/037392 A2, wherein it is disclosed that a service crane can be connected to the hub instead of a rotor blade. A similar example is disclosed by WO 2012/040534, which also discloses that a service crane can be mounted in place of a rotor blade or to a mount between adjacent rotor blades.

A further example of a service crane, which is mounted at a wind turbine is disclosed by EP 2 520 533 A1, according to which a service crane is mounted to the nacelle.

Even further, EP 1 101 934 A2 discloses a wind turbine having an on-board crane (or service crane) arranged in the nacelle of the wind turbine, which on-board crane comprises a frame having a pair of arms, which are pivotally arranged about a horizontal axis in the nacelle. Various loads, e.g. wind turbine parts, can be lifted up by means of a wire or line, which passes a roller arrangement at the outer end of the pair of arms and which is connected to a winch. The e.g. wind turbine parts can be lifted up via an opening in the bottom of the nacelle, when the pair of arms have been pivoted towards the rear end of the nacelle. When the pair of arms have been pivoted towards the front end of the nacelle, the pair of arms extends obliquely upwards and above the hub (or the hub area, in case the hub has not been installed), where the outer ends reach a position slightly in front of the nacelle and above the hub area. In this position, wind turbine parts such as rotor blades, the hub, etc. can be lifted up by means of the winch, the line or wire and the roller arrangement at the outer end of the pair of arms. In one embodiment, the frame having a pair of arms is pivotally arranged at the bottom of the nacelle with the winch arranged in the bottom of the tower of the wind turbine. In another embodiment the nacelle comprises a portal crane frame with a crane trolley, which crane trolley is movable along the portal crane frame above the components in the nacelle, e.g. above the generator, the gearbox, etc. In this another embodiment the pair of arms are arranged at the upper part of the portal crane frame at the front end, where the pair of arms are pivotally arranged about a horizontal axis. Also here, the pair of arms will extend obliquely upwards and above the hub (or the hub area, in case the hub has not been installed), when the pair of arms has been pivoted towards the front end of the nacelle, and the outer ends of the arms may reach a position slightly in front of the nacelle and above the hub area. Both of these embodiments furthermore require that the top of the nacelle can be opened, removed or the like, when it is intended to use the arrangement comprising the pivotable pair of arms.

It will be seen that in connection with both of the embodiments disclosed in EP 1 101 934 A2, that has been described above, the pivotally arranged pair of arms will in the forward position extend obliquely upwards, apparently in an attempt to clear the two rotor blades (in case the rotor blades are mounted) that will be located here. As it is well-known within the field of wind turbines, when the wind turbine is stopped, e.g. in case of service, repair, etc., the hub and the rotor blades are stopped in a position with one rotor blade pointing essentially vertical downwards and the other two (in case it is a three blade wind turbine, which is in most situations the case), pointing obliquely upwards in an approximately 60° direction in relation to the vertical direction. However, it will be seen that it may be difficult to arrange the pivotally arranged pair of arms in such a manner that they do not interfere with the rotor blades, thereby possibly damaging e.g. the surface of the rotor blades, if it is desired to have the outer ends reach forward of the nacelle. Further, it will be understood that such an arrangement with a pivotally arranged pair of arms may have to be designed specifically to the concrete type, size, etc. of wind turbine, in order not to collide with the rotor blades. Even further, the line or wire extending downwards from the outer ends of such a pivotally arranged pair of arms, which has been pivoted forwards, may be problematic e.g. since it may interfere with the hub and/or the rotor blade that is pointing downwards.

Further, it is noted that in connection with service operations performed on e.g. a rotor blade, service tools such as rotor blade guided tools, work platforms, etc. are used as disclosed for example in EP 1 583 905 B1, WO 03/048569 A2, WO 2005/064152 A2, WO 2007/085265 A1, WO 2009/155917 A2 and WO 2009/155918 A2, where such tools are connected for example by one or more lines or wires to fixing points at the top of the wind turbine, e.g. at the tower, at the nacelle or at the hub, and where the tools are being moved up and down a rotor blade pointing downwards by e.g. winches placed at the tools. However, as the wind turbines increase in size, the rotor blades increase correspondingly in size, which also means that, in particular due to the form of the rotor blades, a considerable distance in the horizontal direction between e.g. the tower and the rotor blade will be present, increasing towards the tip of the rotor blade. As the lines or wires are connected to the top of the wind turbine near the tower, it will be understood that the horizontal distance from the fixing point to the tool can be considerable, which may have undesirable effects, e.g. that the lines or wires are influenced by a force that deviates considerably from the vertical direction, that the tool will strain the rotor blade, that the tool, when applied, will have to contact or be entered onto the rotor blade at a relatively high level, e.g. where it is possible to reach the rotor blade, and move downwards along the whole length of the rotor blade, in case it is necessary to get near to the tip of the rotor blade, etc.

SUMMARY

It has been realized by the inventor that there is a need for providing a fixation location, which may provide a better fixing point location for e.g. service tools such as rotor blade guided tools, work platforms, other service facilities for rotor blades, wind turbine towers, etc.

Further, it has been realized by the inventor that there is a need for providing a fixation location, which may provide additional functionalities and which may serve for example in connection with mounting, demounting, replacing, etc. of rotor blades, parts of rotor blades, and/or other components.

Thus, it is an objective of the invention to provide improved fixation facilities at a wind turbine.

Furthermore, it is an objective of the invention to provide such fixation facilities at a wind turbine, whereby disadvantages of the prior art will be alleviated or remedied.

These and other objectives are achieved by the invention as explained in detail in the following.

In a first aspect, the invention relates to a fixation device for providing at least one fixation location at a wind turbine, said wind turbine comprising at least a wind turbine tower, a nacelle and e.g. a hub for a number of rotor blades, wherein
said fixation device comprises at least one fixation arm configured for being arranged at said nacelle and/or said wind turbine tower,
said at least one fixation arm being extendable,
wherein said at least one fixation arm in an inactive state, when arranged at said nacelle, is not extending essentially forward of the nacelle, and
wherein said at least one fixation arm in an active state, where the at least one fixation arm is at least partly extended, extends at least to a position forward of the nacelle and at a level substantially at or below a rotation axis for the rotor blades of the wind turbine.

Hereby it is achieved that a fixation location can be established at a position forward of the nacelle, e.g. when rotor blades are not mounted at the hub or when the rotor blades have been stopped, for example with one of the rotor blades pointing downwards, where such a fixation location may be preferable or even necessary in cases where it is desired to provide support at such a forward position. This may be the case when at least one line or the like is used in connection with service work or the like, which is being performed on a rotor blade, and where, in particular due to the large dimensions of rotor blades and the form of these, e.g. the bent/curved form, which means that they extend a considerable length away from the nacelle and the tower in a horizontal direction, it is desirable to have a fixation location at least forward of the nacelle and preferably a corresponding distance forward of the nacelle in order to have the line extending essentially vertical downward or as close to a vertical direction as possible. Furthermore, by having the at least one fixation arm extending to the position forward of the nacelle at a level substantially at or below a rotation axis for the rotor blades of the wind turbine, it is achieved that the at least one fixation arm can be located without there being a risk that the fixation arm will collide or otherwise interfere with the e.g. two rotor blades that in the service position will be pointing obliquely upwards. Even further, it will hereby be relatively uncomplicated to arrange a line or wire that from the at least one fixation arm extends vertically downwards, e.g. because such a line or wire will not interfere, contact, etc. the hub and/or the two rotor blades that in the service position will be pointing obliquely upwards.

It should be mentioned that by the term "inactive state" it is in this context meant that the at least one fixation arm is not arranged to provide a fixation location forward of the nacelle. Similarly, by the term "active state" it is in this context meant that the at least one fixation arm is arranged to provide a fixation location forward of the nacelle.

Further, it should be mentioned that the fixation device may be arranged as a permanent part, e.g. permanently connected to the nacelle and/or the wind turbine tower, or the fixation device may be arranged as a device, e.g. a mobile device, which may be lifted up to the top of the wind turbine when necessary and connected to the nacelle and/or the wind turbine tower. In the last case the mobile device may for example be configured for being lifted up along the wind turbine tower, while being guided and/or supported by the tower. Further, it should be mentioned that combinations of these embodiments may be used, e.g. with a permanent fixation device, which may provide an extension forward of the nacelle to a first distance, and where a mobile fixation device, which may provide an extension larger than the first distance, may be lifted up, for example via the permanent fixation device, and connected to the permanent fixation device, the nacelle and/or the tower, in cases where the larger extension is necessary.

It should further be mentioned that the fixation device may also be used in connection with e.g. mounting, demounting, replacement of various components of the wind turbine, including the hub or hub parts, parts of the drive train, etc. Thus, it will be understood that the fixation device may be used in connection with e.g. a wind turbine under construction, for example a tower with a nacelle mounted.

Even further, it should be mentioned that the at least one fixation arm may be configured and designed in numerous manners and forms and that the term "arm" should be construed broadly.

Also, it should be mentioned that the fixation device may be used for e.g. service work in general and that it may support e.g. a work platform, also when the at least one fixation arm is in its inactive state and that a work platform supported by the fixation device may be used for service work, inspection or the like also on the tower and e.g. in general on any part of the wind turbine below the fixation device.

According to an embodiment, said at least one fixation arm may in said active state be configured for providing at least one attachment arrangement for a service apparatus, a service device, a line or the like.

By the term "line" will in this context be understood line, wire, rope, chain and/or any other suitable means for providing a similar function.

Further, it should be noted that in connection with such a line suitable hoisting means, e.g. a winch or the like, may be arranged, e.g. directly in connection with the attachment arrangement or the line may be directly connected to the attachment arrangement and hoisting means may be connected to the line. Other arrangements are possible, as it will be apparent to a skilled person.

According to an embodiment, said at least one fixation arm may in said active state be extendable in at least two steps, in both of which said at least one fixation arm extends forward of the nacelle.

In a first step the at least one fixation arm may extend to a position just forward of the nacelle or to a suitable position, e.g. a position suitable for providing support for rotor blade mounting/demounting equipment or the like and in the next step the at least one fixation arm may extend to a position further forward, which may be suitable for providing support for e.g. service equipment, which may reach parts of a rotor blade, which are positioned away from the nacelle and the tower. Other options are possible, as it will be apparent to a skilled person, including that the at least one fixation arm may extend in three steps or more or that the at least one fixation arm may be continuously and adjustably extended and not necessarily in steps.

Further, it should be mentioned that the at least one fixation arm may be adjusted not only in a direction towards the area or zone in front of the nacelle, but that it may also be adjusted in a transverse direction, e.g. by parallel movement, by rotation, etc. e.g. in order to achieve a more suitable fixation location, for example in order to support a service tool, which is being lowered down to a part of a rotor blade which is curved or bent. Other options are possible.

According to a particular embodiment, said fixation device may comprise at least two of said fixation arms, for example one on each side of a centre line for said nacelle.

It should be mentioned that other configurations are possible, e.g. using three, four, five, six, etc. fixation arms and that the fixation arms may be placed symmetrically or non-symmetrically in relation to e.g. a centre line for the nacelle. Further, the fixation arms may be placed at different heights at the nacelle as long as they are arranged such that they extend to the forward position at a level substantially at or below a rotation axis for the rotor blades of the wind turbine. Further, they may be placed in parallel to each other or angled in relation to each other. Also, it is noted that any combinations of these options are possible. When two of said fixation arms are used with for example one on each side of a centre line for said nacelle, the fixation arms may be designed for being extended on each side of a rotor blade, when the rotor blades have been stopped with a rotor blade pointing essentially downwards.

According to a further particular embodiment, said at least two of said fixation arms may be extended in a manner corresponding to each other, e.g. both being extended a first or a second step, or they may be extended differently.

The extended position of each of said fixation arms may as mentioned above be reached by a stepwise extension and/or by a non-step (continuous) extension, and the extensions may be arranged to achieve any suitable pattern of fixing locations.

According to an embodiment, said at least one fixation arm may be configured for being mounted at, on or in the nacelle.

It should be noted that the at least one fixation arm may be arranged at the nacelle as well as at the tower, e.g. the top of the tower, suitably connected to a structural part of the wind turbine, which is able to provide the necessary support and strength. When the at least one fixation arm is configured for being mounted at, on or in the nacelle, it may be designed as a part of the nacelle, for example integrated in the nacelle structure, and/or it may be designed as a part, which is attached to the nacelle, for example on the outer side of the nacelle housing, e.g. on top of the nacelle, at a side of the nacelle, at the bottom of the nacelle, etc.

According to a particular embodiment, said at least one fixation arm may be configured for being mounted in connection with a bottom part of the nacelle, e.g. connected to a nacelle carrier beam, a nacelle carrier structure or the like.

Hereby, the at least one fixation arm may expediently be arranged at the nacelle and in such a manner that it can normally be secured to the carrying structure of the nacelle in a straightforward fashion.

According to a further particular embodiment, said at least one fixation arm may be configured for being mounted in connection with a side or top part of the nacelle as long as the at least one fixation arm is arranged such that it extends to the forward position at a level substantially at or below a rotation axis for the rotor blades of the wind turbine.

Hereby, further advantages may be achieved, e.g. as regards the arrangement of suitable fixation locations.

According to an embodiment, said at least one fixation arm may be configured for being extendable to said position forward of the nacelle by an essentially longitudinal extension and/or by a rotational movement of an element of said at least one fixation arm.

It should be noted that the term "extendable" does not imply that the extension is made as a linear extension, but that the extension of the extension arm according to the invention may be performed as any suitable movement that results in that a part of the fixation arm reaches a position forward of the nacelle. Thus, the fixation arm may be rotatable (or pivotal), whereby a rotation of for example 180° may result in that an end of the fixation arm has been moved to a position forward of the nacelle. Further, it is noted that only a part of the fixation arm may be rotatable. A part of the fixation arm may be linearly extendable to achieve the result. Even further, the fixation arm may comprise linearly extendable as well as rotatable elements to achieve the extension. Other options and/or combinations are possible.

According to an embodiment, said at least one fixation arm may be configured for being arranged at said nacelle in such a manner that it in said inactive state is essentially parallel with a centre line for said nacelle.

Hereby, a relatively simple but efficient embodiment is provided.

It is noted, though, that said at least one fixation arm may instead be configured with an angular position in relation to a centre line for the nacelle, e.g. with a minor angle, in order to adapt to a particular nacelle and/or rotor blade configuration.

According to a particular embodiment, said at least one fixation location provided by said at least one fixation arm may be designed for use in connection with service work on at least one of said rotor blades, on said wind turbine tower and/or other parts of said wind turbine.

Hereby, such service work may be performed in an advantageous manner, since the at least one fixation location may be adapted to the particular service work and to e.g. the particular shape of a rotor blade or another part of the wind turbine.

According to a further particular embodiment, said at least one fixation location provided by said at least one fixation arm may be designed for use in connection with a work platform or the like, e.g. a work platform suspended, lifted and/or lowered from said fixation device by at least one line, wherein said work platform may be designed for being guided by a rotor blade.

Hereby, it is achieved that such a work platform, e.g. a platform guided by the rotor blade, may advantageously be used also in connection with relatively large rotor blades, which due to their form extend a considerable distance away from the tower, and where the forward positioned fixation location facilitates an optimal operation.

According to an embodiment, said at least one fixation arm may be designed for carrying, e.g. suspending, said work platform or the like when said work platform is not used and when said at least one fixation arm is it the inactive state.

Hereby, a work platform or the like may advantageously be parked at the wind turbine for e.g. a shorter or longer period, when it is not used, for example in case a work platform has been lifted up to the top of the wind turbine and used for inspecting a rotor blade and where the work platform is kept at the wind turbine, for example in case it is envisaged that the work platform has to be used again within a foreseeable period. Also, it may be the case that a work platform has been permanently assigned to a wind turbine and, when not in use, is parked, e.g. hanging from the fixation arm or fixation arms in their inactive state. In such cases the work platform or the like may be hanging under the rear part of the nacelle or any other suitable place.

According to a particular embodiment, said at least one fixation location provided by said at least one fixation arm may be designed for use in connection with mounting and/or demounting of at least one of said rotor blades and/or other parts of said wind turbine.

Hereby, such rotor blade mounting/demounting, replacement, etc. or replacement of any other part may be performed in an advantageous manner, e.g. using hoisting equipment supported from the fixation device, which means that e.g. mobile cranes having a lifting height corresponding to the height of the wind turbine need not be used. Further, the work may be performed without any particular special equipment, although a smaller crane may be needed to e.g. stabilize the tip of a rotor blade.

Further, it is noted that such rotor blade mounting/demounting, replacement, etc. may also be performed in connection with two-part rotor blades, i.e. rotor blades comprising two sections (or even more than two), and where e.g. the outer section is demounted first and lowered to the ground or to a service vessel by use of the fixation device according to the invention and that, if needed, the inner part of the rotor blade is demounted next. Also, it may be the case, that only the outer part of the rotor blade has to be replaced, in which case it is removed as explained above and a new outer part is mounted, again using the fixation device according to the invention. Mounting of such sectional rotor blades may be performed correspondingly.

In a second aspect, the invention relates to a wind turbine comprising at least a wind turbine tower, a nacelle and e.g. a hub for a number of rotor blades, said wind turbine comprising a fixation device according to any one of claims 1 to 14.

Hereby, a fixation device according to an embodiment of the invention is provided as a permanent part of a wind turbine or it is provided as a device, e.g. a mobile device, which is used for a period, e.g. days, weeks, etc. in connection with a wind turbine, and whereby advantages as indicated above and in the following are achieved.

In a third aspect, the invention relates to a method of providing a fixation location in connection with a wind turbine comprising at least a wind turbine tower, a nacelle and e.g. a hub for a number of rotor blades, said method comprising providing a fixation device according to any one of claims 1 to 14, bringing the rotor blades to a stop in case the wind turbine is rotating, bringing at least one fixation arm of said fixation device from an inactive state to an active state by extending said at least one fixation arm to a position forward of the nacelle and at a level substantially at or below a rotation axis for the rotor blades of the wind turbine, and deploying an apparatus, a device, a line or the like, e.g. by attaching a line or the like to said at least one fixation arm at an attachment position forward of the nacelle.

Hereby it is achieved that a fixation location can be established at a position forward of the nacelle, e.g. when rotor blades are not mounted at the hub or when the rotor blades have been stopped, for example with one of the rotor blades pointing downwards, and whereby an apparatus, a device, a line or the like may expediently be deployed using the fixation location, e.g. by attaching a line or the like to said at least one fixation arm. This may for example be the case when an apparatus, a device, a line or the like is used in connection with service work or the like, which is being performed on a rotor blade, and where, in particular due to the large dimensions of rotor blades and the form of these, e.g. the bent/curved form, which means that they extend a considerable length away from the nacelle and the tower in a horizontal direction, it is desirable to have a fixation location at least forward of the nacelle and preferably a corresponding distance forward of the nacelle in order to have e.g. the supporting line extending essentially vertical downward or as close to a vertical direction as possible.

Furthermore, by having the at least one fixation arm extending to the position forward of the nacelle at a level substantially at or below a rotation axis for the rotor blades of the wind turbine, it is achieved that the at least one fixation arm can be located without there being a risk that the fixation arm will collide or otherwise interfere with the rotor blades that in the service position will be pointing obliquely upwards. Even further, it will hereby be relatively uncomplicated to arrange a line or wire that from the at least one fixation arm extends vertically downwards, e.g. because such a line or wire will not interfere, contact, etc. the hub and/or the two rotor blades that in the service position will be pointing obliquely upwards.

It should be mentioned that by the term "inactive state" it is in this context meant that the at least one fixation arm is not arranged to provide a fixation location forward of the nacelle. Similarly, by the term "active state" it is in this context meant that the at least one fixation arm is arranged to provide a fixation location forward of the nacelle.

Further, it should be mentioned that the fixation device may be arranged as a permanent part, e.g. permanently connected to the nacelle and/or the wind turbine tower, or the fixation device may be arranged as a device, e.g. a mobile device, which may be lifted up to the top of the wind turbine when necessary and connected to the nacelle and/or the wind turbine tower. In the last case the mobile device may for example be configured for being lifted up along the wind turbine tower, while being guided and/or supported by the tower. Further, it should be mentioned that combinations of these embodiments may be used, e.g. with a permanent fixation device, which may provide an extension forward of the nacelle to a first distance, and where a mobile fixation device, which may provide an extension larger than the first distance, may be lifted up, for example via the permanent fixation device, and connected to the permanent fixation device, the nacelle and/or the tower, in cases where the larger extension is necessary.

According to an embodiment, the method may comprise deploying a work platform for use in connection with service work or the like.

Hereby, it is achieved that such a work platform, e.g. a platform guided by the rotor blade, may advantageously be used also in connection with relatively large rotor blades, which due to their form extend a considerable distance away from the tower, and where the forward positioned fixation location facilitates an optimal operation.

According to an embodiment, the method may comprise deploying a line, a hoist, a winch or the like, which is used in connection with mounting and/or demounting a rotor blade, and whereby the hub of the wind turbine has been stopped in a position with a rotor blade, a fixing flange on the hub for a rotor blade and/or the like essentially pointing downwards.

Hereby, such rotor blade mounting/demounting, replacement, etc. or replacement of any other part may be performed in an advantageous manner, e.g. using hoisting equipment supported from the fixation device, which means that e.g. mobile cranes having a lifting height corresponding to the height of the wind turbine need not be used. Further, the work may be performed without any particular special equipment, although a smaller crane may be needed to e.g. stabilize the tip of a rotor blade.

Further, it is noted that such rotor blade mounting/demounting, replacement, etc. may also be performed in connection with two-part rotor blades, i.e. rotor blades comprising two sections (or even more than two), and where e.g. the outer section is demounted first and lowered to the ground or to a service vessel by use of the fixation device according to the invention and that, if needed, the inner part of the rotor blade is demounted next. Also, it may be the case, that only the outer part of the rotor blade has to be replaced, in which case it is removed as explained above and a new outer part is mounted, again using the fixation device according to the invention.

According to a particular embodiment, at least two of said at least one fixation arms may be used, for example located on each side of a centre line for said nacelle.

It should be mentioned that other configurations are possible, e.g. using three, four, five, six, etc. fixation arms and that the fixation arms may be placed symmetrically or non-symmetrically in relation to e.g. a centre line for the nacelle. Further, the fixation arms may be placed at different heights at the nacelle and further, they may be placed in parallel to each other or angled in relation to each other. Also, it is noted that any combinations of these options are possible. When two of said fixation arms are used with for example one on each side of a centre line for said nacelle, the fixation arms may be designed for being extended on each side of a rotor blade, when the rotor blades have been stopped with a rotor blade pointing essentially downwards.

BRIEF DESCRIPTION OF THE DRAWINGS

The invention will be described in detail in the following with reference to the drawings, in which FIGS. 4-6 show in a corresponding schematic manner use of a fixation device according to an aspect of the invention for mounting or demounting of a rotor blade of a wind turbine, FIGS. 9a-9c show a schematic sectional view seen from above and through the centre of the rotor hub of a nacelle with a fixation system according to an aspect of the invention, wherein various states of the fixation arms are illustrated, FIG. 10 shows a schematic sectional view seen from above, corresponding to FIG. 9c, but at a lower level illustrating an arrangement for lifting/lowering a rotor blade, e.g. for mounting/demounting, replacing, etc. a rotor blade or part of a rotor blade, FIGS. 13a-c show schematic sectional views corresponding to FIGS. 9a-c, i.e. seen from above and through the centre of the rotor hub of a nacelle with a fixation system according to an aspect of the invention, wherein the fixation arms comprise pivotal elements, FIG. 14 is a schematic illustration of the use of a fixation device corresponding to FIG. 4, but in connection with mounting or demounting of a rotor blade of a sea-based wind turbine, FIG. 15 is an illustration corresponding to FIG. 7, but wherein a further use of a fixation device according to an aspect of the invention is shown for deploying a work platform for e.g. servicing, repairing, inspecting, etc. a rotor blade as well as the tower of a wind turbine, FIGS. 16-22 illustrate a mobile fixation device according to an embodiment of the invention, FIGS. 23-30 illustrate use of a fixation device in connection with work platforms, service equipment and the like, FIGS. 31-47 illustrate a permanent fixation device and use of work platforms in connection with such a permanent fixation device, FIGS. 48-54 illustrate a permanent fixation device with a pivotal fixation arm, and FIGS. 55-59 illustrate use of such a permanent fixation device for rotor blade change, removal and/or installing.

DETAILED DESCRIPTION

Figure 1:
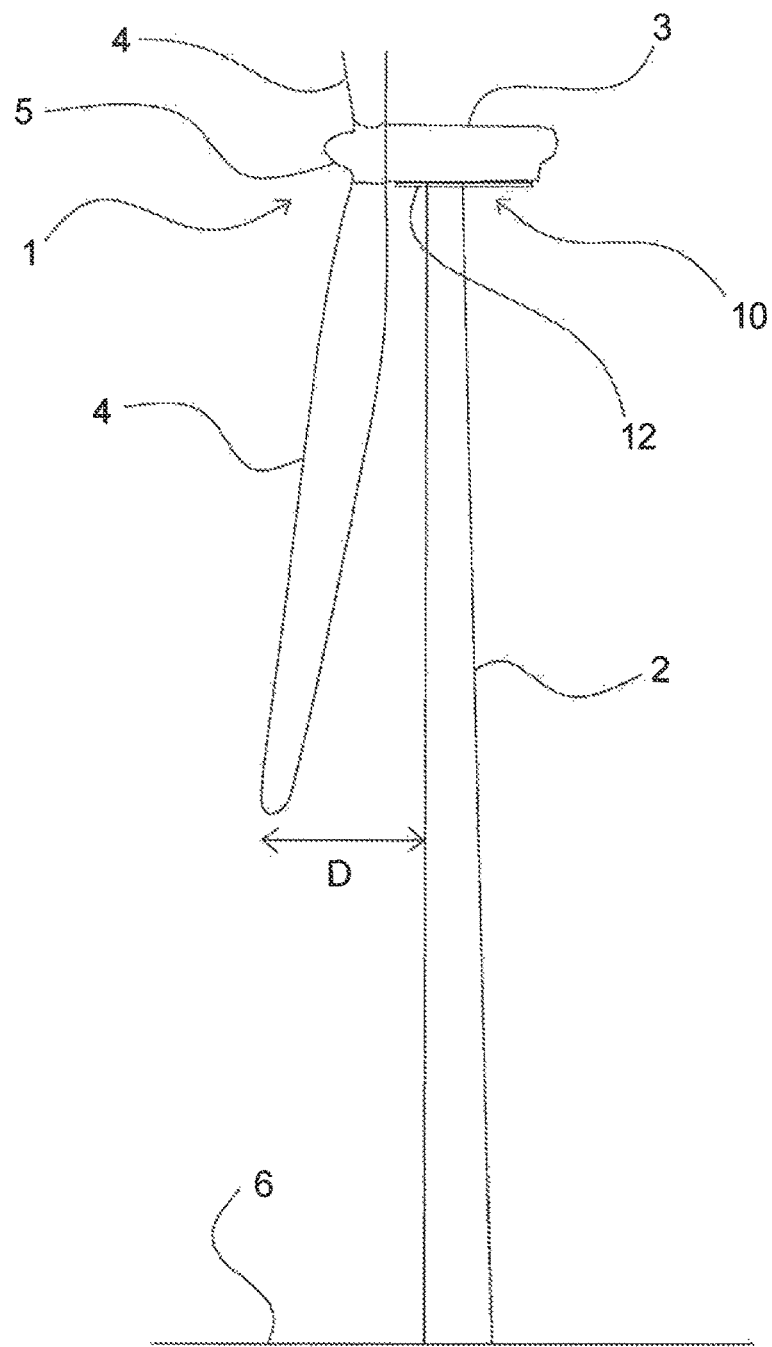
FIGS. 1-3 show in a schematic manner a fixation device according to a first aspect of the present invention in connection with a land-based wind turbine.
Figure 2:
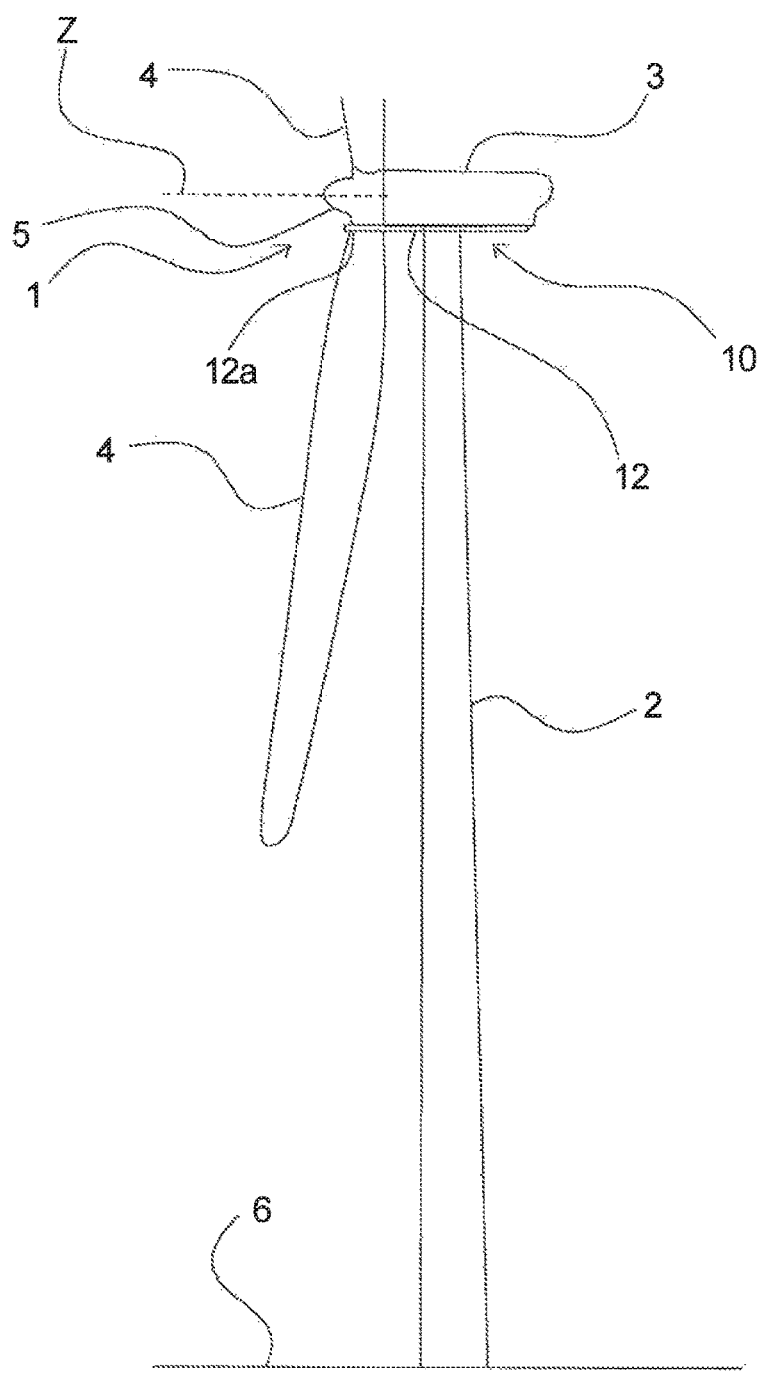
Figure 3:
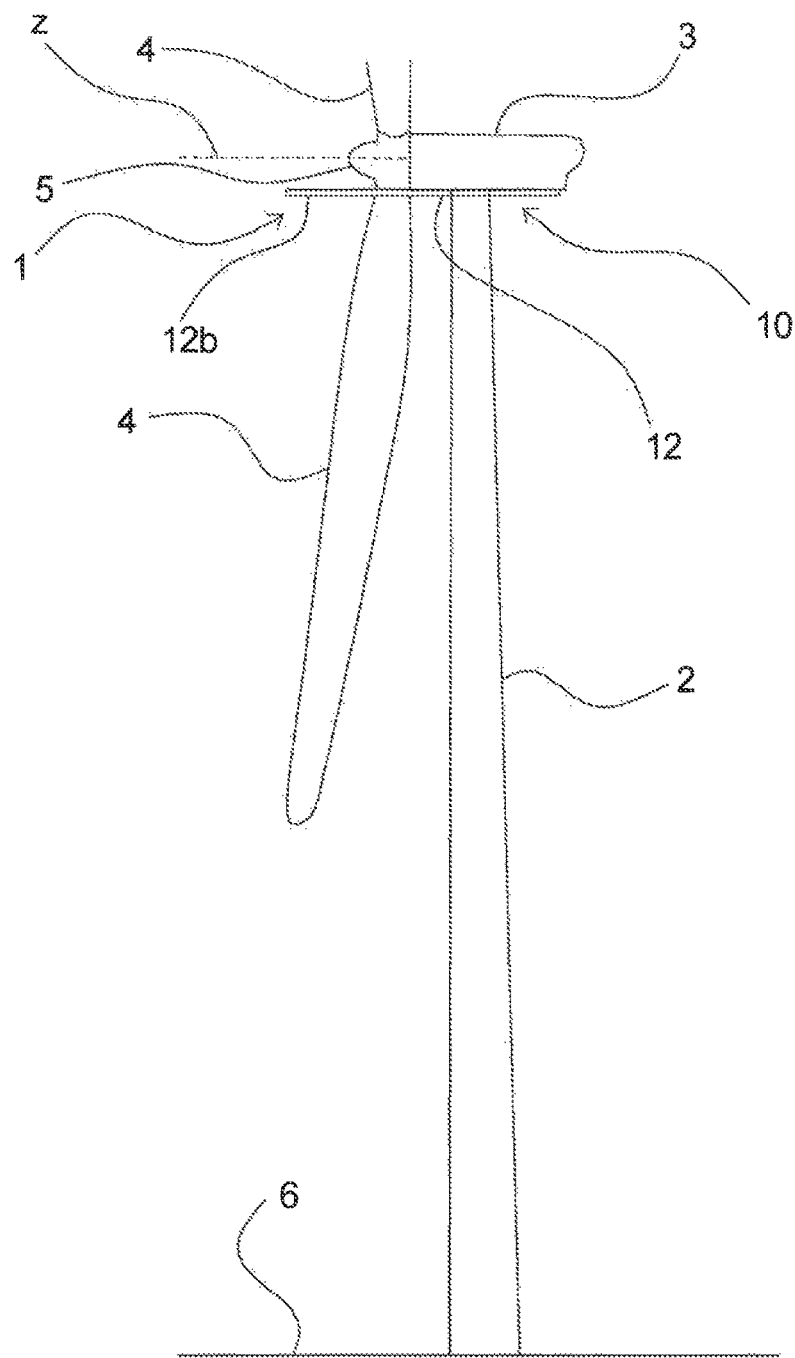

A fixation device 10 according to a first aspect of the present invention is shown in FIGS. 1-3, wherein the fixation device 10 is shown in a schematic manner in connection with a land-based (on-shore) 6 wind turbine 1, which for the sake of clarity also is shown in a schematic manner only. It will be apparent that the fixation device 10 may be used in connection with a sea-based (off-shore) wind turbine as well and in the same manner as explained in the following.

The wind turbine 1 comprises generally a tower 2, a nacelle 3 and a hub 5, upon which a number of rotor blades 4 are mounted, for example three rotor blades.

As wind turbines have been continuously growing in size, the challenges involved when performing service work, replacement of rotor blades, etc. have also been increased. In order to perform work such as replacement of e.g. rotor blades, cranes have been used for land-based as well as sea-based wind turbines, which due to the increasing height of wind turbines have increased costs considerably, both because of the great size of the crane equipment and because the circumstances need to be suitable, when using such equipment, e.g. the weather condition in general and the wind condition in particular, especially when sea-based wind turbines are considered.

Further, in connection with e.g. service work, repair, inspection, etc. of the rotor blades a work platform may be used, which via hoisting means and lines, wires or the like has been connected to fixing points at the top of the wind turbine, e.g. at the tower, at the nacelle or at the hub 5. However, due to the increasing sizes this may also be more difficult as exemplified in FIG. 1, where the distance D shows the distance from the blade tip to the tower 2. When a work platform (not shown in FIGS. 1-3) is fixed at e.g. the nacelle 3 or the top of the tower 2 and it is desired to place the work platform at the blade tip, a line from the top of the wind turbine tower 2 to the work platform will form a relatively large angle in relation to the vertical, which will strain the equipment used and make the job more difficult.

The fixation device 10 as shown in FIGS. 1-3 provides solutions to these problems as it will be exemplified in the following.

In FIG. 1 the fixation device 10 is shown with at least one fixation arm 12 arranged below the nacelle 3, where the fixation arm is in an inactive state, i.e. a state wherein it has not been extended. It is noted that the wind turbine 1 is arranged with a rotor blade 3 pointing downwards, but other positions may be possible.

In FIG. 2 the fixation device 10 is shown with the at least one fixation arm 12 in an active state, wherein it has been extended to a first step 12a, e.g. wherein it extends to a position forward of the nacelle at a level substantially at or below the rotation axis Z for the rotor blades 3 and essentially extends to a position at the side of the root of the rotor blade 4.

In FIG. 3 the fixation device 10 is correspondingly shown with the at least one fixation arm 12 in an active state, wherein it has been extended to a second step 12b, e.g. wherein it extends to a position further forward of the nacelle at a level substantially at or below the rotation axis Z for the rotor blades 3 and wherein the fixation arm essentially extends to a position vertically above a lower part of the rotor blade 4, possibly even above the tip of the rotor blade.

It is noted that the fixation device 10 may be arranged as a permanent part, e.g. permanently connected to the nacelle 3 and/or the wind turbine tower 2, or the fixation device 10 may be arranged as e.g. a mobile device, which may be lifted up to the top of the wind turbine when necessary and connected to the nacelle and/or the wind turbine tower. In the last case the mobile device 10 may for example be configured for being lifted up along the wind turbine tower 2, while being guided and/or supported by the tower 2. Further, it should be noted that combinations of these embodiments may be used, e.g. with a permanent fixation device 10, which may provide an extension forward of the nacelle 3 to a first distance, and where a mobile fixation device, which may provide an extension larger than the first distance, may be lifted up, for example via the permanent fixation device, and connected to the permanent fixation device, the nacelle and/or the tower, in cases where the larger extension is desired or necessary.

Figure 4:
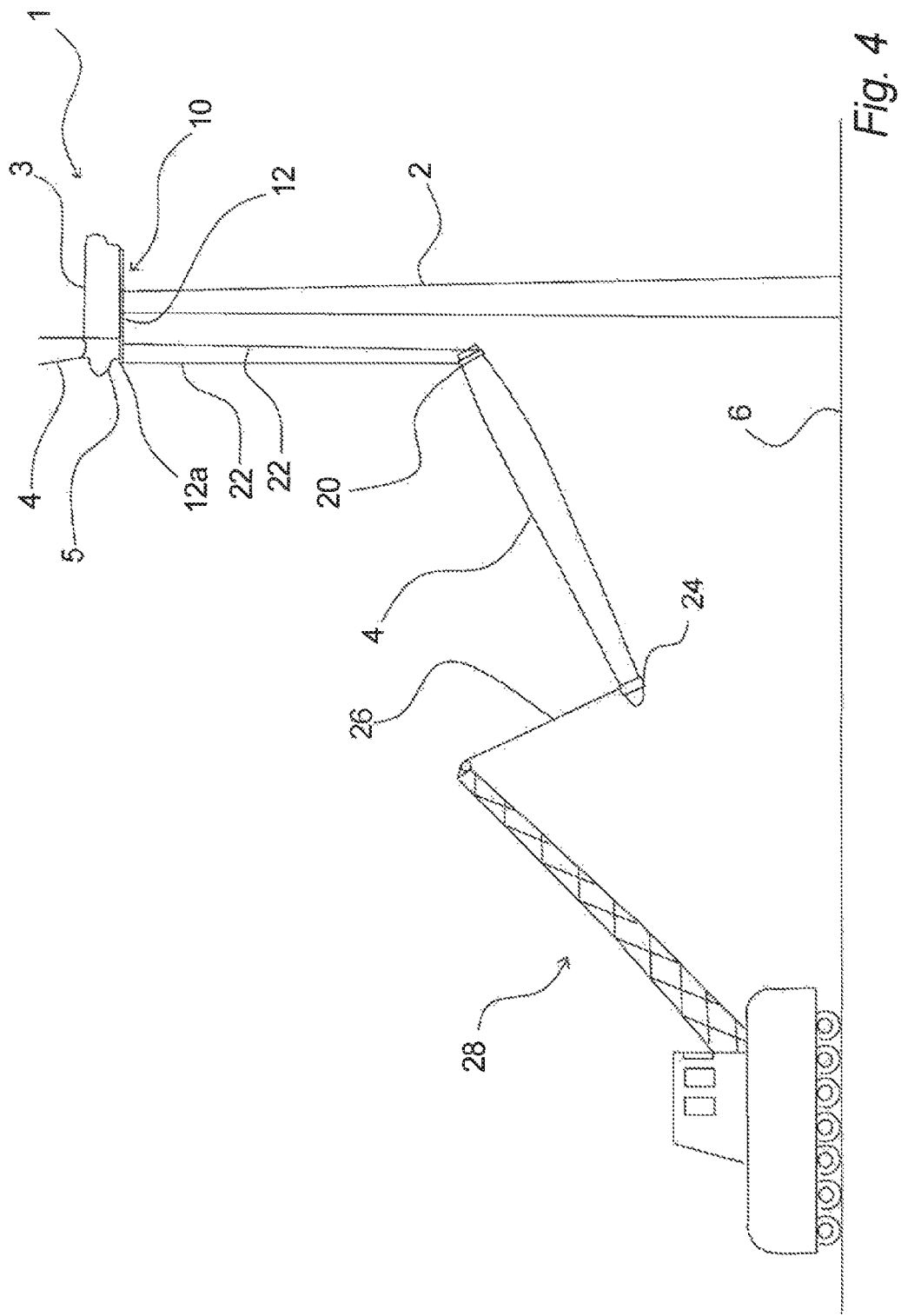

In FIGS. 4-6 is illustrated the use of a fixation device 10 according to an aspect of the invention for mounting or demounting of a rotor blade 4 of a wind turbine 1.

In FIG. 4 it is shown that a rotor blade 4 is being lifted from the ground 6 by means of lines 22, which at the upper ends are fixed to the fixation device 10, which has at least one—and in this example preferably two—fixation arms 12 extended to a first extension step 12a. At the lower ends the lines 22 are fixed to a blade gripper 20, which grips the rotor blade 4 at the root part. It will be understood that hoisting equipment (not shown) will be included for lifting and lowering by use of the lines 22. At the outer end or the tip end of the rotor blade 4 it may be stabilized by means of crane equipment 28, which is schematically shown in FIGS. 4-5 and which by means of a crane line 26 is connected to a blade gripper 24.

In FIG. 5 it is shown that the rotor blade 4 has been lifted farther towards the hub 5 and that the crane equipment 26, 28 has moved correspondingly. Finally, it is shown in FIG. 6 that the rotor blade 4 has been lifted up to the hub 5, where it has been connected to the hub 5. The blade gripper 20 is shown placed on the rotor blade 4 in FIG. 6 for illustrative purposes.

These steps may be repeated for the other rotor blades 4, e.g. the at least one fixation arm 12 may be retracted to an inactive state, the hub 5 may be rotated to the next position, the at least one fixation arm 12 may be extended and a rotor blade 4 may be lifted and mounted, etc.

It will be apparent that these steps may be reversed, e.g. the process from FIGS. 6 to 4 may illustrate a demounting of a rotor blade 4.

Further, it is noted that instead of a rotor blade 4 that is replaced, mounted or demounted as a single structure, the rotor blades 4 may be sectional structures, e.g. comprising an inner part and an outer part. Each of these may in principle be mounted or demounted in the same manner as described above, e.g. in case of mounting a rotor blade the inner part is lifted and connected to the hub as shown in FIGS. 4-6 and subsequently the outer or tip part of the rotor blade is lifted in a corresponding manner, e.g. by means of the lines 22 lifted up to the end of the already mounted inner part and connected to this. Demounting is performed in the reverse order. Further, it will be understood that various blade grippers 20, 24 may be used, for example specifically designed for sectionally designed rotor blades, where special considerations may be taken.

Figure 7:
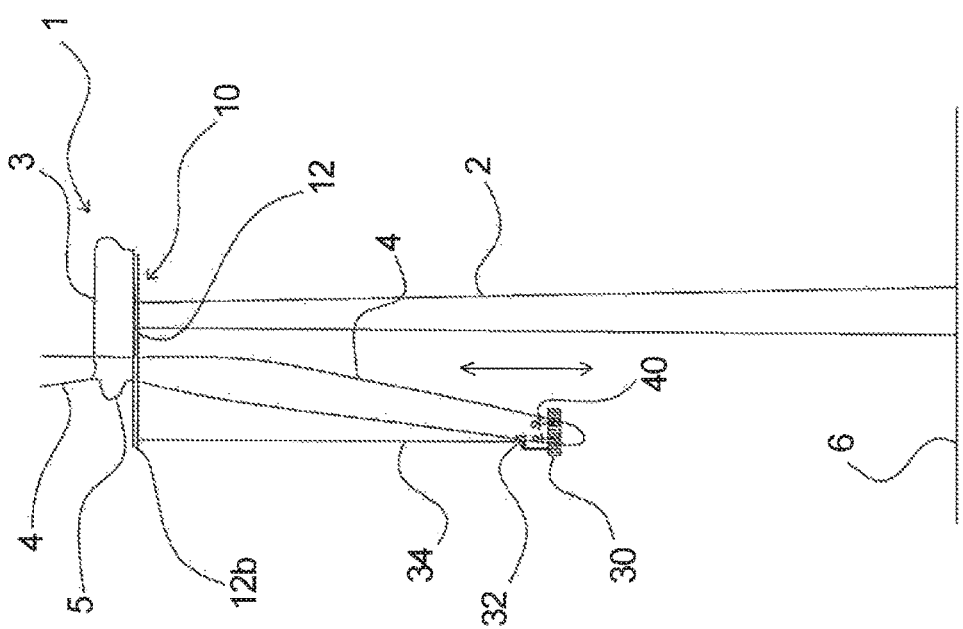
FIG. 7 shows in a corresponding schematic manner use of a fixation device according to an aspect of the invention for deploying a work platform for e.g. servicing, repairing, inspecting, etc. a rotor blade of a wind turbine.

A method of using a fixation device 10 according to an aspect of the invention for deploying a work platform 30 for e.g. servicing, repairing, inspecting, etc. of a rotor blade 4 of a wind turbine 1 is shown in a correspondingly schematic manner in FIG. 7. Here, the fixation device 10 is shown with the at least one fixation arm 12 extended to a second step 12. Also here it may be preferable that at least two fixation arms 12 are used.

A work platform 30 of a kind that may be guided by the rotor blade 4, e.g. by a guiding part 32 comprising e.g.

supporting rollers or the like that may guide the work platform at the front edge and/or the rear edge is shown. Further, it is shown that the work platform 30 may be used by workers 40, even though it may also be automatically operated. The work platform 30 also comprises hoisting means for lifting/lowering by means of lines 34. As shown, when using such a work platform 30 the rotor blade 4 may be parked with its front edge pointing essentially away from the tower 2. Thus, the distance from the tip of the rotor blade to the tower may be considerable. In consideration of this, the fixation device 10 may in such a circumstance have its fixation arms 12 extended correspondingly as indicated in FIG. 7, whereby the lines 34 for lifting and lowering the work platform 30 may be essentially vertically connected between the fixation device and the work platform 30.

Figure 8:
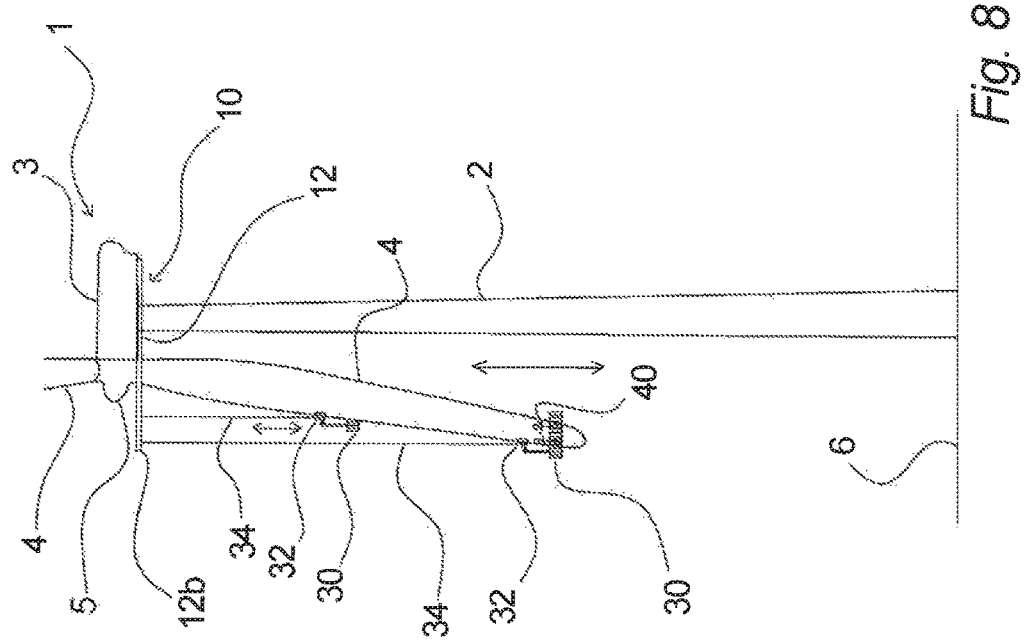
FIG. 8 shows in a corresponding schematic manner use of a fixation device as shown in FIG. 7, but here for deploying two work platforms for e.g. servicing, repairing, inspecting, etc. a rotor blade of a wind turbine.

FIG. 8 shows a corresponding arrangement involving use of a fixation device as shown in FIG. 7, but here for deploying two work platforms 30 for e.g. servicing, repairing, inspecting, etc. a rotor blade 4 of a wind turbine 1. These two work platforms 30 may be connected to the same fixation device 10 having preferably two or more fixation arms 12. The two work platforms 30 may share the fixation arms or they may be connected to different fixation arms 12. Further, the two (or more) work platforms 30 may operate independently, for example with one on each side of a rotor blade, or they may operate together, for example coupled together control-wise and/or physically.

In FIGS. 9a-9c are shown schematic sectional views seen from above and through the centre of the rotor hub 5 of a nacelle 3 with a fixation system according to an aspect of the invention, wherein various states of the fixation arms 12 are illustrated. Further, the area, zone or volume generally forward of the nacelle 3 is indicated by means of the punctuated line 44.

As shown, the nacelle 3 may have a centre line 42 extending through the centre of the tower 2 and through the hub 5. The hub may as indicated carry three rotor blades 4, one of which in the figures is shown pointing downwards. On each side under or in the floor of the nacelle 2 a fixation arm 12 is shown in a schematic manner.

As shown in FIG. 9b each of these fixation arms 12 have been extended to the position or first step 12a forward of the nacelle 3 and it will be understood that the extensions will clear the rotor blade 4 that is pointing downwards.

In FIG. 9c it is correspondingly shown that each of the fixation arms 12 have been extended to the position or second step 12b forward of the nacelle 3, which essentially may correspond to a position vertically above the farthest edge of the rotor blade 4. As mentioned, the two fixation arms 12 need not be extended to the same position and furthermore, they need not be arranged e.g. symmetrically in relation to the centre line 42 and they need not be arranged in the same level or height in or under the nacelle. As also mentioned, they may also be arranged on top of the nacelle 2, as long as they are arranged to extend to the forward position at a level substantially at or below the rotation axis for the rotor blades of the wind turbine, or even connected to the top of the wind turbine tower 2.

FIG. 10 shows a schematic sectional view seen from above, corresponding to FIG. 9c, but at a lower level. Here, an arrangement for lifting/lowering a rotor blade 4, e.g. for mounting/demounting, replacing, etc. a rotor blade 4 or part of a rotor blade is illustrated. The fixation device 10 is here shown with two fixation arms 12 extended to the first step 12a as well as to the second step 1b. Further, it is shown that the fixations arms 12 are equipped with attachment arrangements 14, which in the illustrated example may be used for providing connections for lines 22, which are connected to blade gripper parts 20a, 20b, which grips around the root of the rotor blade 4 and may serve for lifting and lowering a rotor blade as explained in connection with FIGS. 4-6.

Figure 11:
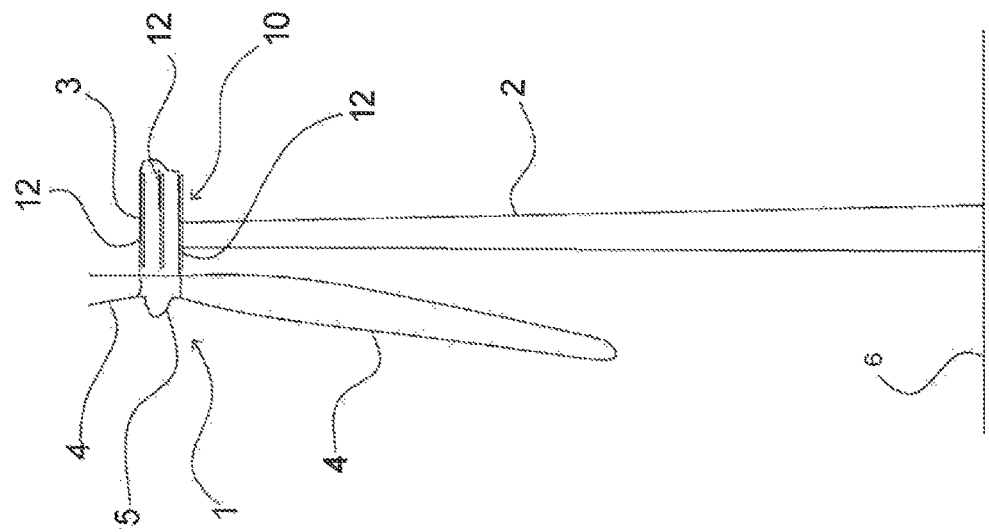
FIG. 11 shows corresponding to FIG. 7 a fixation device for deploying a work platform and where the work platform has been parked at the fixation device in its inactive state.

In FIG. 11 a wind turbine 1 is shown with a fixation device 10 as shown in FIG. 7, where the arrangement is used for deploying a work platform 30. However, in FIG. 11 it is shown that the work platform 30 may be parked at the fixation device 10 in its inactive state. According to this embodiment the work platform 30 may advantageously be parked at the wind turbine 1 for e.g. a shorter or longer period, when it is not used, for example in case a work platform has been lifted up to the top of the wind turbine and used for inspecting a rotor blade 4 and where the work platform 30 is kept at the wind turbine, for example in case it is envisaged that the work platform 30 has to be used again within a foreseeable period. Also, it may be the case that the work platform 30 has been permanently assigned to the wind turbine and, when not in use, is parked, e.g. hanging from the fixation arm 12 or fixation arms 12 in their inactive state. Thus, the work platform 30 may as shown be hanging under the rear part of the nacelle 3 or in any other suitable place.

Figure 12:
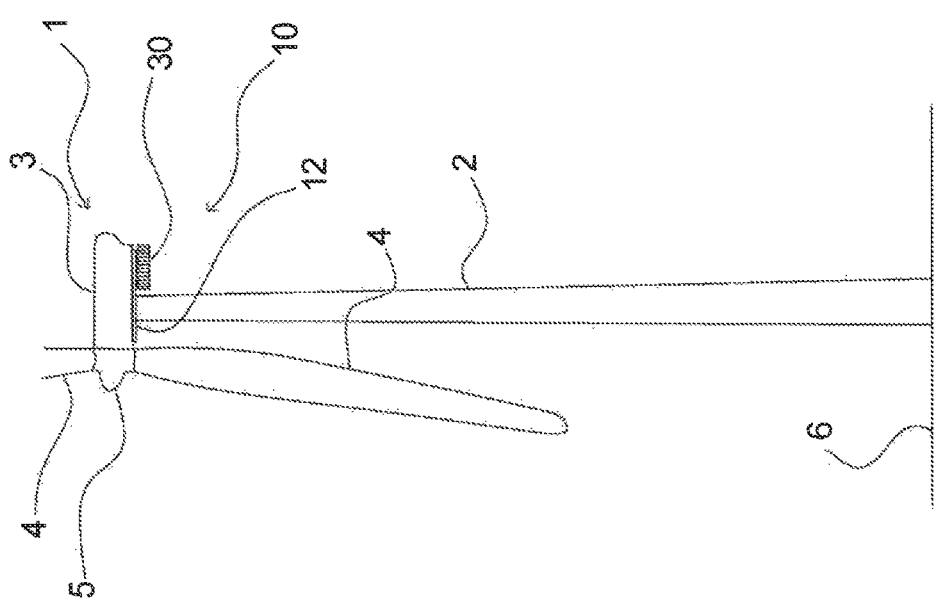
FIG. 12 shows a schematic view corresponding to FIG. 1, but where various locations of a fixation device according to an aspect of the invention are illustrated, e.g. at the bottom of the nacelle, at the side of the nacelle and possibly at the top of the nacelle.

FIG. 12 shows a schematic view corresponding to FIG. 1, but showing various locations of a fixation device 10 with fixation arms 12 according to an aspect of the invention. For example, the fixation arm 12 may as illustrated be placed at the bottom of the nacelle 3, at the side of the nacelle 3 and/or at the top of the nacelle 3. Further, it is noted that other locations are also possible. However, it is noted that as regards the locations at the side of the nacelle 3 and/or at the top of the nacelle 3, particular arrangements may be necessary to achieve that the fixation arm 12 of the fixation device 10 from the inactive state to the active state extends to a position forward of the nacelle, which is at a level substantially at or below the rotation axis for the rotor blades of the wind turbine. For all these locations at the nacelle 3 it should be noted that the fixation arm or arms may be integrated in the nacelle itself, may be located inside the nacelle or outside the nacelle, but that essentially the fixation arm or arms have to be securely connected to a structure that can carry the necessary load, for example a carrier beam for the nacelle, a structural component of the nacelle, etc. Further, as mentioned above, one or more of the fixations arms may be connected to or carried by e.g. a top part of the wind turbine tower 2.

FIGS. 13a-c show further schematic sectional views corresponding to FIGS. 9a-c, i.e. seen from above and through the centre of the rotor hub 5 of a nacelle 3 with a fixation system according to an aspect of the invention. FIGS. 13a-13c correspond in general to FIGS. 9a-c, respectively, but with the exception that the fixation arms 12 here may comprise pivotal elements 13, which may be rotated to achieve the extended position or step of the fixation arms 12. In the shown example the fixation arms comprise an element 12, which can be extended in a linear fashion, and an element 13, which can pivot or rotate in relation to the element 12. This may have the advantage that one or more parts of the fixation arms may be adjusted also in the transverse direction, for example as shown in FIG. 13c, where the outermost parts may be adjusted sideways, for example in order to arrange the fixation positions to better suit the e.g. rotor blade, for example in case the rotor blade is much curved.

It will be understood that more than one of the elements making up a fixation arm 12 may be pivotal or rotatable and that even the part of a fixation arm that is connected to e.g. the nacelle may be rotatable in relation to the nacelle.

FIG. 14 illustrates in a manner corresponding to FIG. 4 as described above that a rotor blade 4 is being lifted up in connection with a mounting operation, but in connection with a sea-based wind turbine 2, e.g. where the sea-based (off-shore) wind turbine may be positioned on a transition piece (TP) 46, on top of which e.g. a platform 48 is positioned. Thus, the rotor blade is being lifted by lines 22 fixed to the fixation device 10 as previously described and the end part of the rotor blade 4 may be stabilized by means of crane equipment 28, which here is arranged on a relatively small vessel. Apart from this, the operations are performed as described in connection with FIG. 4 and as explained for the subsequent steps in connection with FIGS. 5 and 6.

Thus, it is apparent that rotor blades on sea-based wind turbines may also be demounted, replaced, etc. as explained in connection with land based wind turbines by use of the fixation device according to the invention.

It should be mentioned that costs can be considerably reduced as compared to traditional methods used in connection with sea based wind turbines, when e.g. replacing, mounting or demounting rotor blades or other components, since the use of large vessels, barges, jack-up rigs, etc. with large crane equipment can be avoided and instead only small and cost efficient vessels can be used for facilitating the jobs.

FIG. 15 is an illustration corresponding to FIG. 7, but wherein a further use of a fixation device 10 according to an aspect of the invention is shown for deploying a work platform 30 for e.g. servicing, repairing, inspecting, etc. a rotor blade 4 as well as the tower 2 of a wind turbine 1. As explained in connection with FIGS. 7 (and 8) the fixation device 10 may serve for supporting e.g. work platforms for servicing the rotor blades 4, but it will be understood that such a work platform 30 (or any other suitable platform) may be used in general for performing service, work, inspection, etc. on essentially any part below the fixation device 10, including the tower 2. In this connection the line or lines 34 supporting the work platform 30 may be placed in a corresponding suitable location on the fixation device 10 as shown in FIG. 15, e.g. near the tower 2.

Further, it will be understood that the fixation locations may be moved along the fixation device 10 in any suitable manner, e.g. along a guide, rail or the like, in order to provide a suitable fixation location for the actual work being carried out.

Even further, it will be understood that the at least one fixation arm in its inactive state may also be used for providing one or more fixation locations, e.g. in a zone, which is not forward of the nacelle.

Further embodiments and examples according to the invention will be described in the following with reference to FIGS. 16 to 59. The same reference numbers as used above will be used herein for the same or similar features.

Figure 17:
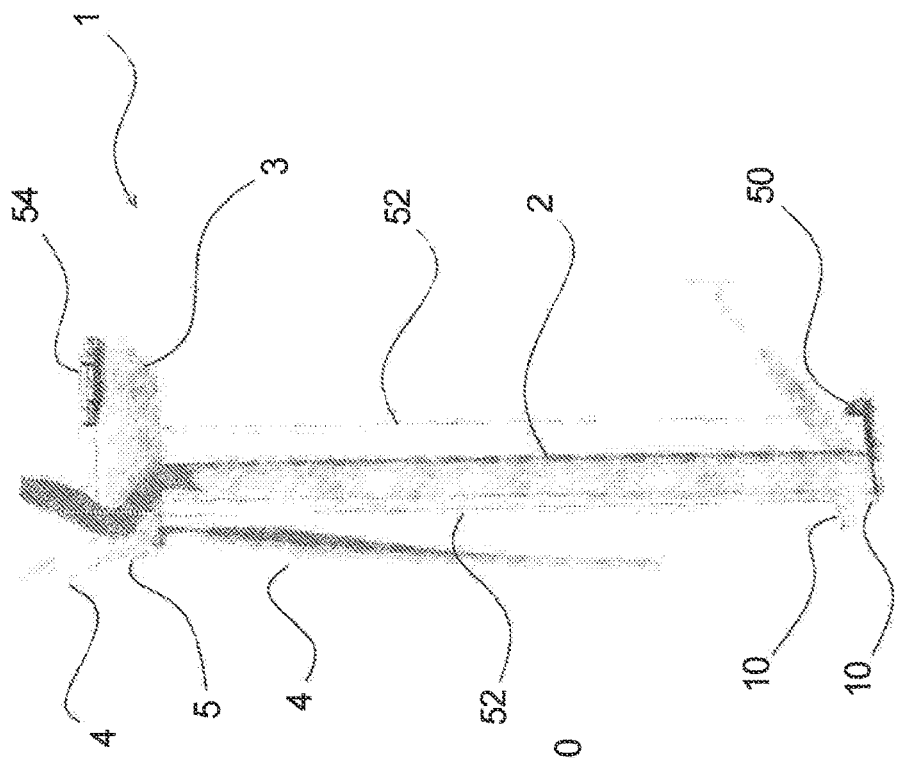
Figure 16:
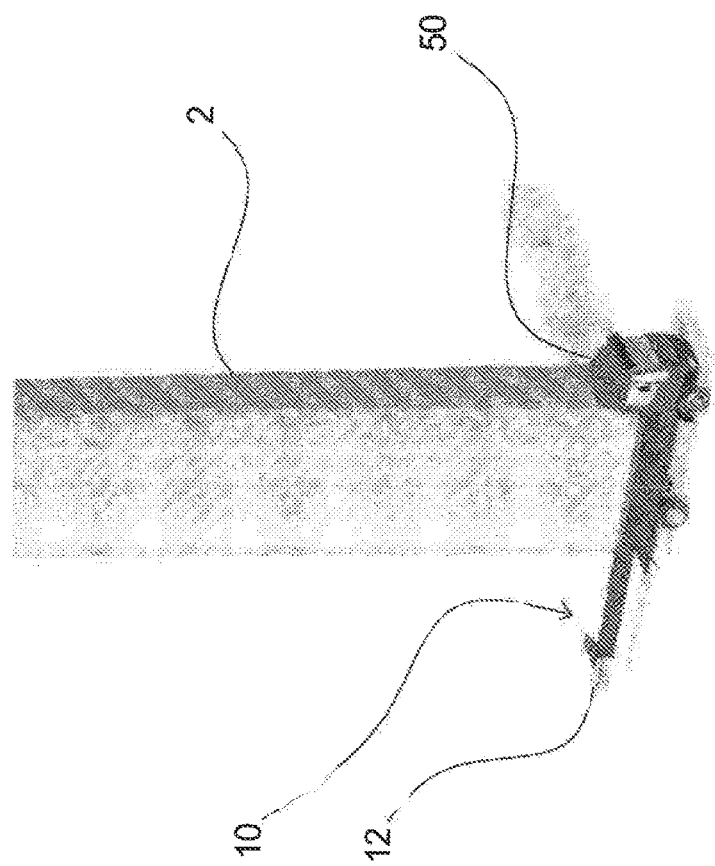
Figure 19:
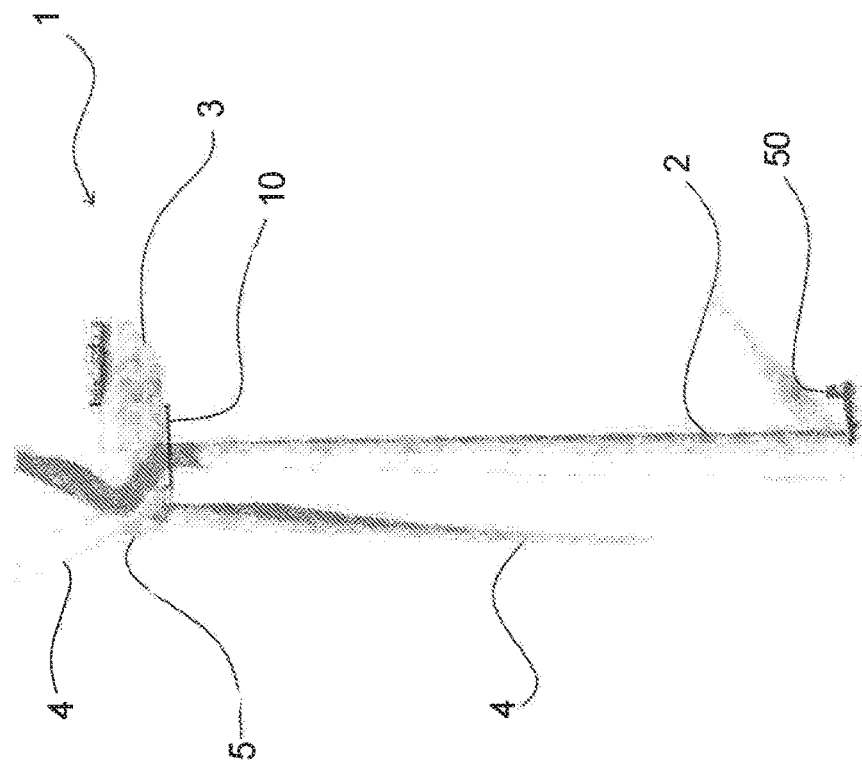
Figure 18:
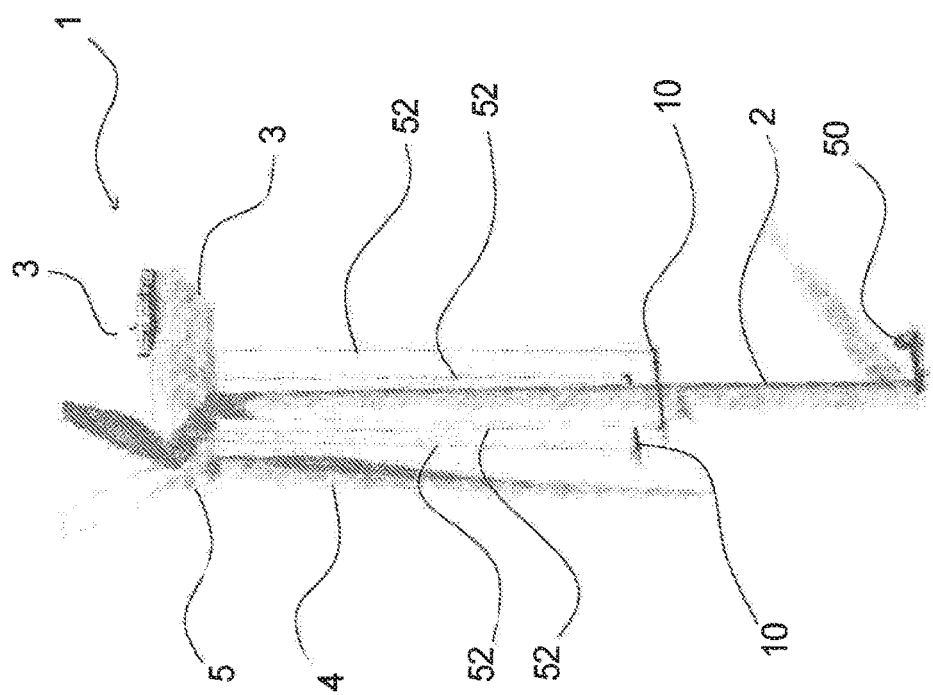

In FIGS. 16 to 19 the deployment of a mobile system for providing a fixation device is illustrated. In FIG. 16 it is shown that one or more fixation devices 10, e.g. comprising fixation arms 12, have been transported to a wind turbine, i.e. at the lower part of the tower 2, by a transport vehicle, truck or the like 50. In FIGS. 17 to 19 it is shown that each of these fixation devices 10 is lifted up to the bottom of the nacelle 3 of the wind turbine 1 by means of lines 52 and by means of winches or the like (not shown). When the fixation devices 10 have reached the nacelle 3, e.g. the bottom of the nacelle, they are connected, for example by bolting or any other suitable means, to the nacelle 3, for example one on each side of the tower, whereafter they are ready to be used as fixation devices. It will be understood that after use they may be disconnected again from the nacelle and lowered down for use at another wind turbine and/or another wind turbine site.

Figure 22:
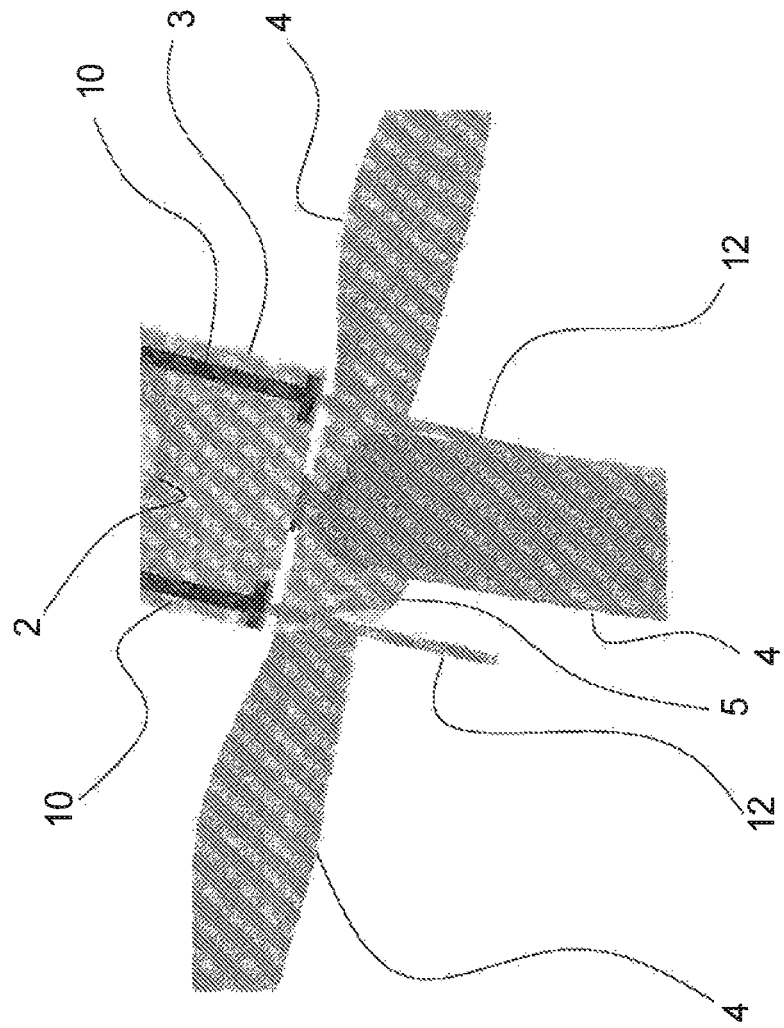

These mobile fixation devices will be further explained with reference to FIGS. 20 to 22, wherein a part of a nacelle 3, the hub 5 and part of the rotor blades 4 are seen from below. Further, a part of the tower 2 is indicated in these figures. In FIG. 20 the fixation devices 10 are shown mounted to the bottom of the nacelle 3 with the fixation arms 12 only slightly extended or not extended, e.g. in an inactive state. In FIG. 21 the fixation arms 12 are extended further, e.g. corresponding to a first step, and in FIG. 22 the fixation arms 12 have been extended even further, e.g. corresponding to a second step. The functioning of the fixation arms 12 as shown in FIGS. 20 to 22 corresponds essentially to the functioning of fixation arms that are permanently mounted, as it has been explained above, e.g. as means for providing attachment locations forward of the nacelle, but also e.g. under the nacelle.

An example of uses of such fixation arms 12, e.g. including fixation arms of a mobile fixation device system, will be illustrated with reference to FIGS. 23 to 30. In FIG. 23 it is shown that a work platform 30 or similar service equipment is being lifted up along the tower 2 by means of lines or wires 34 that may be connected to the fixation devices 10 via winches or the like, which winches may be part of the work platform 30 or be parts that are located at the fixation device. In FIG. 24 it is shown that the work platform 30 or similar service equipment has reached the top of the tower 2, where it is now being operationally connected to the fixation device 10, e.g. ready to be moved along the fixation device 10 under the nacelle 3.

Figures 25, 26:
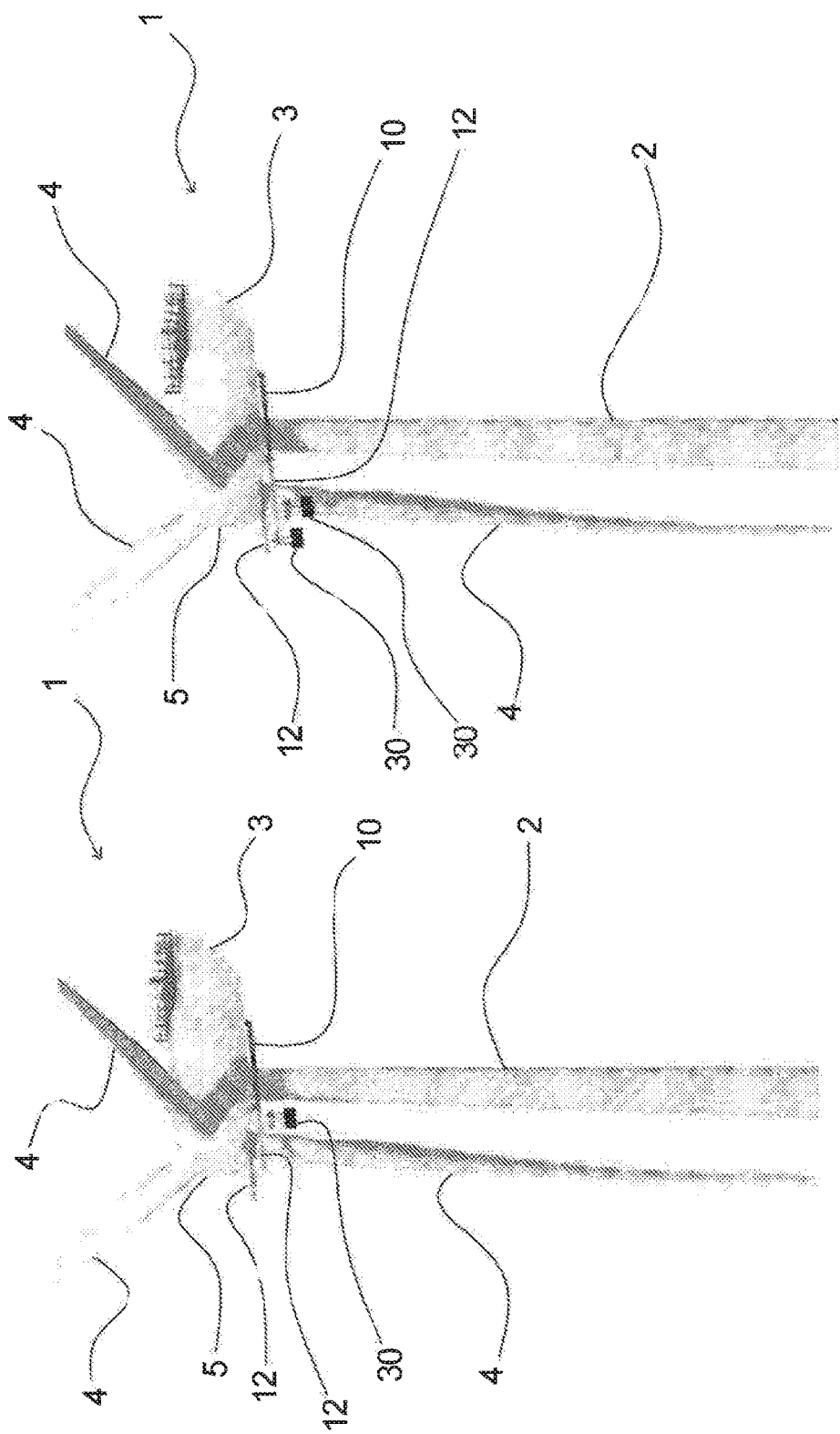
Figure 54:
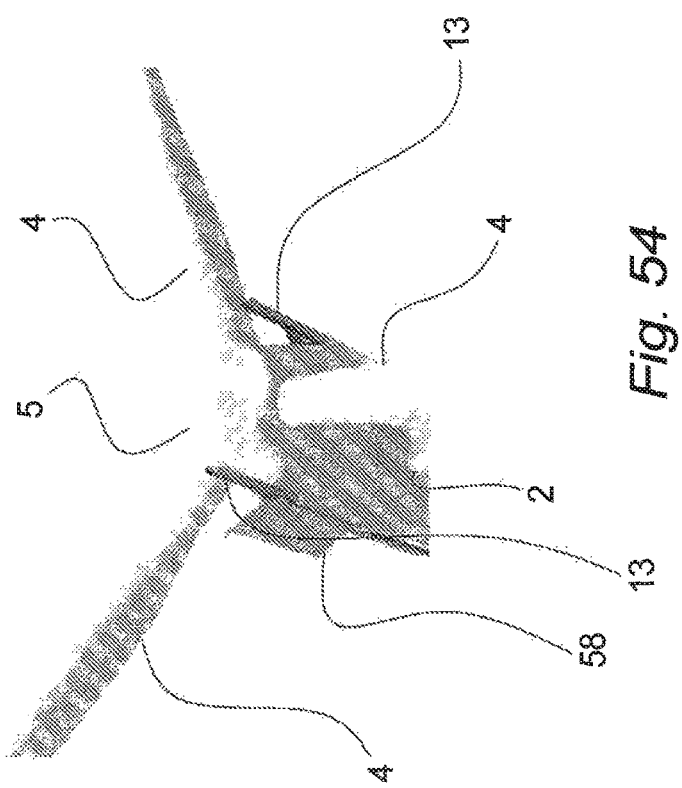
Figure 55:
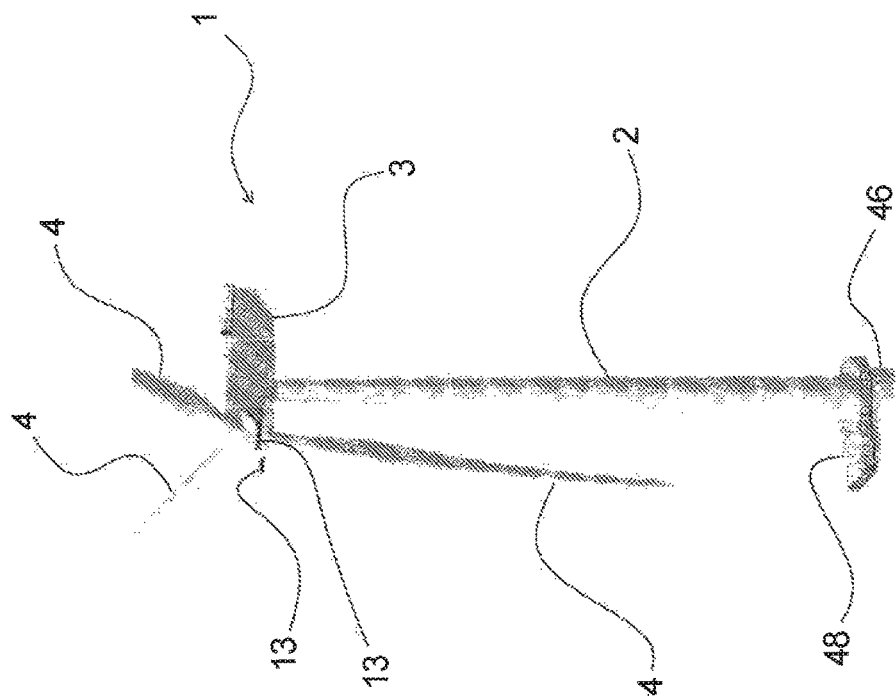
Figure 57:
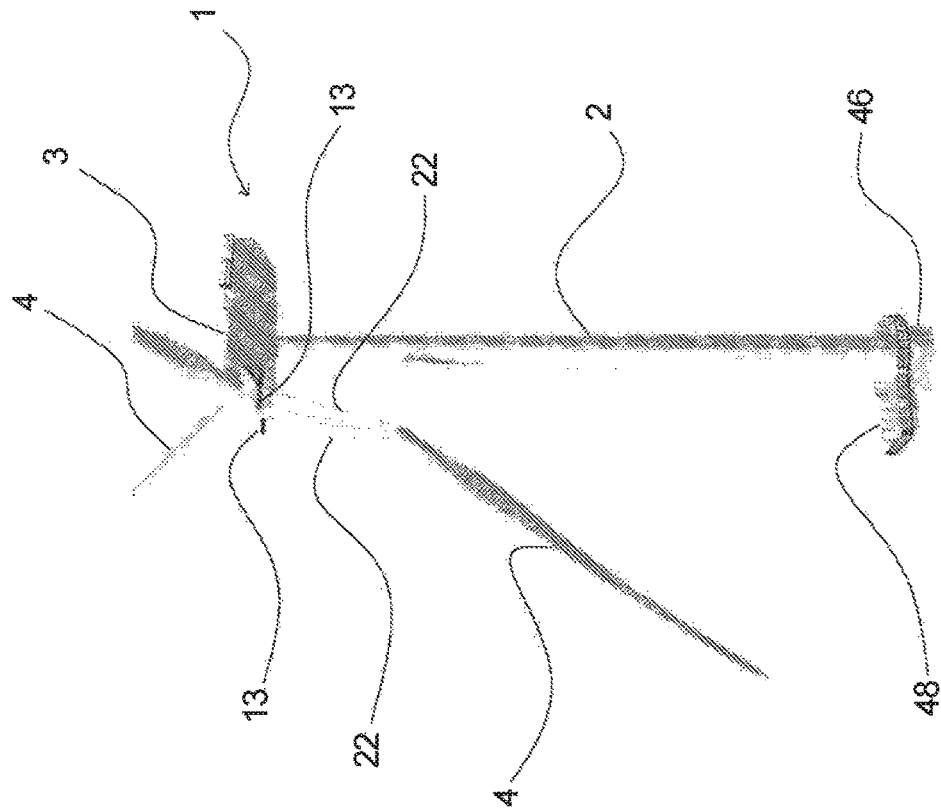

This is further illustrated in FIGS. 25 to 30, where in FIGS. 25 and 26 it is shown that the fixation arms 12 have been extended and that a work platform 30 may move independently along each of the fixation arms 12 to a suitable location, from where the work platform 30 can be lowered down as shown in FIGS. 27 and 28. As it can be seen from these figures, essentially all parts of the rotor blade 4 can be reached in this manner, while the lines or wires 34 will still be suspending the work platforms 30 in an essentially vertical direction. FIGS. 29 and 30 show in enhanced views work platforms 30 located at and near the tip of the rotor blade 4 with the service persons 40 performing the necessary work on the rotor blade. The fact that the work platforms 30 are suspended in an essentially vertical direction at essentially all times provides numerous advantages, including ease of control of the work platforms.

Further examples of the invention will be described in connection with FIGS. 31 to 47, which exemplify a permanent fixation device, which furthermore is combined with permanently arranged work platforms, inspection platforms or the like.

In FIG. 31 a nacelle 3 with hub 5 and rotor blades 4 is shown, seen from the side. At the bottom of the nacelle 3, a permanent fixation device 10 is located at each side. This nacelle 2 is shown from the bottom in FIGS. 32 to 34, where it is shown that a retractable covering 56 can be moved to the rear as indicated with the arrow, whereby a pair of work platforms 30 or the like is uncovered (FIG. 34). These work platforms 30 have been lifted up under the nacelle 2 to be stored and as shown in FIGS. 35 to 37, wherein the lower part of the nacelle 2 is seen from the rear end, the work platforms 30 can now be tilted downwards to the operational position as shown in FIG. 37.

As it is further shown in FIGS. 38 and 39, wherein the lower part of the nacelle is seen partly from the rear and partly from the side, one or more workers or service persons 40 can now enter the work platforms 30, e.g. via a hatch in the bottom of the nacelle and possibly via ladders or the like.

The further operation is exemplified in FIGS. 40 to 43, wherein the nacelle is seen partly from the front and partly from the side. As shown in FIGS. 41 and 42, the fixation devices 10 are now made operational by extending the fixation arms 12, whereafter the work platforms 30 can be moved independently along the fixation device and the fixation arms 12 to suitable positions as seen in e.g. FIGS. 42 and 43.

A further embodiment is shown in FIG. 44, where it is shown that the fixation device 10 may further comprise a pivotal extension arm 13, which can move the work platform (or the attachment point for the work platform) towards the centre of the wind turbine, e.g. towards the front and/or rear edge of the rotor blade 4 as shown in FIGS. 44, 45 and 46.

As shown in FIG. 46, the work platforms 30 can hereafter be lowered down by means of the lines or wires 34. This is also exemplified in FIG. 47, wherein an off-shore wind turbine 1 is shown, e.g. located on a foundation with a transition piece 46 and a lower platform 48. It will be understood that the operation of the work platforms 30 according to this embodiment and by use of the permanent fixation devices will take place in essentially the same manner as shown and as described in connection with FIGS. 29 and 30.

A further embodiment of a fixation device according to the invention will be described with reference to FIGS. 48 to 54, wherein FIGS. 48 to 51 show a nacelle 2 with hub 5 and rotor blades 4, seen partly from the front and partly from the side. Here, a permanent fixation device 10 is arranged at each side of the nacelle 2, but covered by a fixation device cover 58. When this fixation device cover 58 is opened as shown in FIGS. 49 to 51, a pivotal fixation arm 13 can be deployed and moved to the operational position as shown in FIG. 51, where it can serve various purposes as a fixation device. It will be understood that it may also comprise a further extension, extending e.g. further forward, if desired, for example in case it is desired to use it as attachment point for a work platform or the like.

This fixation device 10 comprising a pivotal fixation arm 13 is furthermore shown in FIG. 52, seen slightly from below and from the front. Furthermore, it is shown in FIG. 53 in connection with an off-shore wind turbine seen from above, and in FIG. 54 it is furthermore seen from below. As it is clearly seen from these figures, the fixation device 10 with the pivotal fixation arms 13 provides fixation locations forward of the nacelle 3 at positions substantially at or below the rotation axis for the rotor blades 4, e.g. the rotation axis for the hub, and that furthermore this is done without the fixation device and lines, wires, etc. interfering, colliding, etc. with either of the rotor blades, the hub and/or other parts of the wind turbine.

A particular use of such a fixation device 10 comprising a pivotal fixation arm 13 will be exemplified in connection with FIGS. 55 to 59, wherein it is shown that it can be used as attachment and fixation device in connection with installing and replacing of rotor blades 4.

Figure 56:
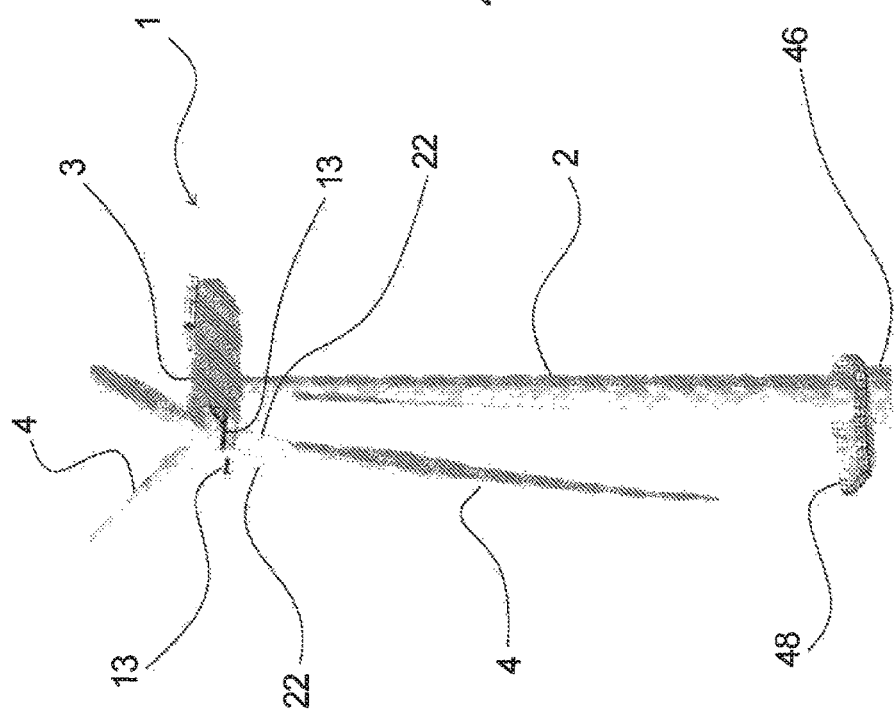

In FIGS. 55 to 59 this is shown only in connection with removal of a rotor blade 4, but it will be understood, as it has been explained in connection with FIGS. 4, 5 and 6 that the operation can be reversed and that the installing of a rotor blade can be performed in the same, but reverse manner. As seen in FIG. 56, the rotor blade 4 is connected to the pivotal fixation arms 13 by a multiple of wires or lines 22. After being disconnected from the hub 5, the rotor blade 4 can be lowered down, e.g. supported by a ship crane or the like at the lower end as previously explained, until it has been lowered completely down in a safe and controlled manner, cf. FIGS. 57 to 59.

It will be understood that the invention is not limited to the particular examples described above and as shown in the drawings, but may be modified in numerous manners within the scope of the invention as specified in the claims. Further, it will be understood that the various modifications and details disclosed above and in the drawings may be combined in a multitude of combinations within the scope of the invention.

What is claimed is:

1. A fixation device for providing at least one fixation location at a wind turbine, said wind turbine comprising at least a wind turbine tower, a nacelle and a hub for a number of rotor blades, wherein
    said fixation device comprises at least one fixation arm configured for being arranged at said nacelle
    wherein said at least one fixation arm in an active state, where the at least one fixation arm is at least partly extended, extends at least to a position forward of the nacelle and at a level substantially at or below a rotation axis for the rotor blades of the wind turbine;
    wherein said at least one fixation arm is configured for being mounted at, on or in the nacelle;
    wherein said at least one fixation arm being extendable; and
    wherein said at least one fixation arm in an inactive state is not extending essentially forward of the nacelle, and said at least one fixation arm is mounted to a bottom part of the nacelle.

2. The fixation device according to claim 1, wherein said at least one fixation arm in said active state is configured for providing at least one attachment arrangement for a service apparatus, a service device, a line, a wire, a rope, or a chain.

3. The fixation device according to claim 1, wherein said at least one fixation arm in said active state is extendable in at least two steps, in both of which said at least one fixation arm extends forward of the nacelle.

4. The fixation device according to claim 1, wherein said fixation device comprises at least two of said fixation arms.

5. The fixation device according to claim 4, wherein said at least two of said fixation arms can be extended in a manner corresponding to each other.

6. The fixation device according to claim 1, wherein said at least one fixation arm is configured for being mounted in connection to a nacelle carrier beam or a nacelle carrier structure.

7. The fixation device according to claim 1, wherein said at least one fixation arm is configured for being extendable to said position forward of the nacelle by an essentially longitudinal extension and/or by a rotational movement of an element of said at least one fixation arm.

8. The fixation device according to claim 1, wherein said at least one fixation arm is configured for being arranged at said nacelle and/or said wind turbine tower in such a manner that it in said inactive state is essentially parallel with a centre line for said nacelle.

9. The fixation device according to claim 1, wherein said at least one fixation location provided by said at least one fixation arm is designed for use in connection with service work on at least one of said rotor blades, on said wind turbine tower and/or other parts of said wind turbine.

10. The fixation device according to claim 9, wherein said at least one fixation location provided by said at least one fixation arm is designed for use in connection with a work platform.

11. The fixation device according to claim 10, wherein said at least one fixation arm is designed for carrying said work platform when said work platform is not used and when said at least one fixation arm is in the inactive state.

12. The fixation device according to claim 1, wherein said at least one fixation location provided by said at least one fixation arm is designed for use in connection with mounting and/or demounting of at least one of said rotor blades and/or other parts of said wind turbine.

13. A wind turbine comprising at least a wind turbine tower, a nacelle and a hub for a number of rotor blades, said wind turbine comprising the fixation device according to claim 1.

14. A method of providing a fixation location in connection with a wind turbine comprising at least a wind turbine tower, a nacelle and a hub for a number of rotor blades, said method comprising:
providing the fixation device according to claim 1,
bringing the rotor blades to a stop in case the wind turbine is rotating,
bringing at least one fixation arm of said fixation device from an inactive state to an active state by extending said at least one fixation arm to a position forward of the nacelle and at a level substantially at or below a rotation axis for the rotor blades of the wind turbine, and
deploying an apparatus, a device, a line, a wire, a rope or a chain by attaching a line, a wire, a rope or a chain to said at least one fixation arm at an attachment position forward of the nacelle.

15. The method according to claim 14, whereby the method comprises deploying a work platform for use in connection with service work.

16. The method according to claim 14, whereby the method comprises deploying a line, a hoist, or a winch, which is used in connection with mounting and/or demounting a rotor blade, and whereby the hub of the wind turbine has been stopped in a position with a rotor blade, a fixing flange on the hub for a rotor blade pointing downwards.

17. The method according to claim 14, whereby at least two of said at least one fixation arms are used.

18. The fixation device according to claim 2, wherein said at least one fixation arm in said active state is extendable in at least two steps, in both of which said at least one fixation arm extends forward of the nacelle.

19. The fixation device according to claim 4, wherein on each side of a centre line for said nacelle is one fixation arm of said at least two of said fixation arms.

* * * * *